United States Patent
Sumida et al.

(10) Patent No.: US 7,244,476 B2
(45) Date of Patent: Jul. 17, 2007

(54) DISPLAY DEVICE INCLUDING ADHESIVE FILM WITH TRANSPARENT SUPPORT

(75) Inventors: Yukihiro Sumida, Yamatokoriyama (JP); Takashi Sato, Tenri (JP); Hidenori Kihara, Tenri (JP); Noriko Watanabe, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/902,828

(22) Filed: Aug. 2, 2004

(65) Prior Publication Data

US 2005/0003108 A1 Jan. 6, 2005

Related U.S. Application Data

(62) Division of application No. 09/948,567, filed on Sep. 10, 2001, now Pat. No. 6,784,962.

(30) Foreign Application Priority Data

Sep. 25, 2000 (JP) .............................. 2000-290494

(51) Int. Cl.
*G02F 1/1333* (2006.01)
(52) U.S. Cl. ...................... 428/1.5; 428/41.9; 428/220; 349/122; 349/95; 349/96
(58) Field of Classification Search ................. 428/1.1, 428/1.5, 1.53–1.55, 40.1, 40.2, 41.3, 41.5, 428/480, 220, 41.9; 349/95–96, 98, 117, 349/122; 359/496, 606, 619
See application file for complete search history.

(56) References Cited

U.S. PATENT DOCUMENTS

| 4,139,278 A | * | 2/1979 | Matsumoto et al. | ........... 345/94 |
| 4,414,275 A | * | 11/1983 | Woods | ........................ 428/352 |
| 5,286,408 A | | 2/1994 | Naemura et al. | ....... 252/299.01 |
| 5,459,019 A | * | 10/1995 | Kato et al. | ............. 430/270.11 |
| 5,462,701 A | * | 10/1995 | Hagemeyer et al. | ......... 264/482 |
| 5,543,942 A | | 8/1996 | Mizuguchi et al. | ............ 349/5 |
| 5,555,476 A | | 9/1996 | Suzuki et al. | .................. 349/95 |

(Continued)

FOREIGN PATENT DOCUMENTS

JP        7-43703 A        2/1995

(Continued)

OTHER PUBLICATIONS

Goto et al., WO 01/26876 A1, Apr. 2001.*

(Continued)

*Primary Examiner*—Rena Dye
*Assistant Examiner*—Sow-Fun Hon
(74) *Attorney, Agent, or Firm*—Nixon & Vanderhye, PC

(57) ABSTRACT

Adhesive layers are formed on the two opposing surfaces of a transparent support. At least one of the adhesive layers is made of a material of which the cured state may be changed. The adhesive layer is irradiated with light and a lens sheet is then pressed against the adhesive layer. The adhesive layer is cured. In this illustrative way, a laminate film of the lens sheet fixed to the transparent support via the adhesive layer may be obtained. The laminate film may be bonded to a polarizing plate on the viewer's side of a liquid crystal display element via the other adhesive layer.

16 Claims, 21 Drawing Sheets

U.S. PATENT DOCUMENTS

| | | | |
|---|---|---|---|
| 5,600,462 A | 2/1997 | Suzuki et al. | 349/112 |
| 5,714,218 A | 2/1998 | Nishio et al. | 428/64.1 |
| 5,721,289 A | 2/1998 | Karim et al. | 522/31 |
| 5,851,664 A | 12/1998 | Bennett et al. | 428/343 |
| 5,880,800 A | 3/1999 | Mikura et al. | 349/122 |
| 6,002,464 A | 12/1999 | Fujisawa et al. | 349/112 |
| 6,067,137 A | 5/2000 | Ohnishi et al. | 349/112 |
| 6,078,371 A | 6/2000 | Ichikawa et al. | 349/95 |
| 6,137,555 A | 10/2000 | Tamura et al. | 349/95 |
| 6,147,732 A | 11/2000 | Aoyama et al. | 349/112 |
| 6,221,454 B1 * | 4/2001 | Saito et al. | 428/64.1 |
| 6,440,880 B2 | 8/2002 | Mazurek et al. | 442/151 |
| 6,582,789 B1 * | 6/2003 | Sumi | 428/40.1 |
| 6,592,802 B1 * | 7/2003 | Goto et al. | 264/496 |
| 6,602,599 B1 * | 8/2003 | Toyoda et al. | 428/355 AC |
| 6,784,962 B2 * | 8/2004 | Sumida et al. | 349/122 |
| 2002/0113925 A1 | 8/2002 | Higashi | 349/113 |
| 2002/0130990 A1 | 9/2002 | Nakamura | 349/95 |
| 2002/0176038 A1 | 11/2002 | Watanabe et al. | 349/112 |

FOREIGN PATENT DOCUMENTS

| | | |
|---|---|---|
| JP | 7-120743 A | 5/1995 |
| JP | 9-127309 A | 5/1997 |
| JP | 9-194799 A | 7/1997 |
| JP | 9-279103 A | 10/1997 |
| JP | 10-73808 | 3/1998 |
| JP | 11-166159 | 6/1999 |
| JP | 2000-047332 | 2/2000 |
| JP | 2000-246855 | 9/2000 |
| KR | 2000-35326 | 6/2000 |

OTHER PUBLICATIONS

Suzuki et al, JPO Website Machine English Translation of JP 07-043703, Feb. 1995.*

Mizuno et al, JPO Website Machine English Translation of JP 11-053651, Mar. 1999.*

Office Action in JP 2000-290494, Feb. 8, 2005.

* cited by examiner

STRIPE ARRAY

DELTA ARRAY

FIG.3A
FIG.3B
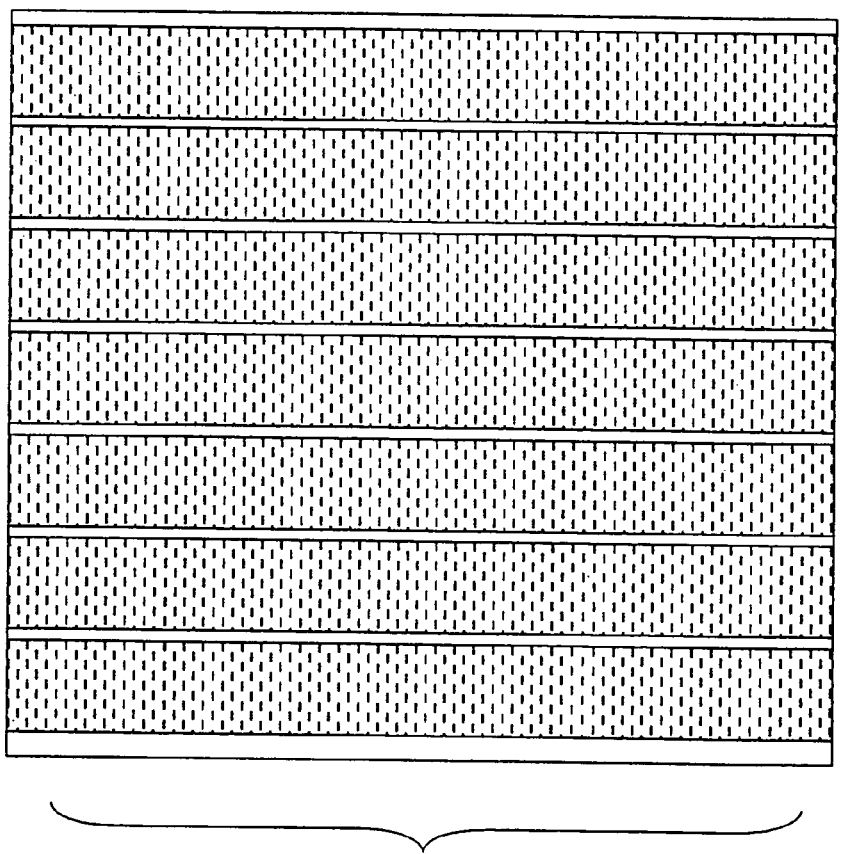
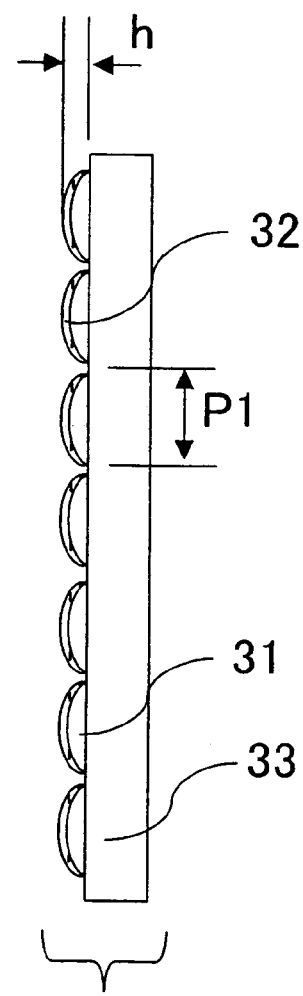
30
30

FIG.16A
FIG.16B
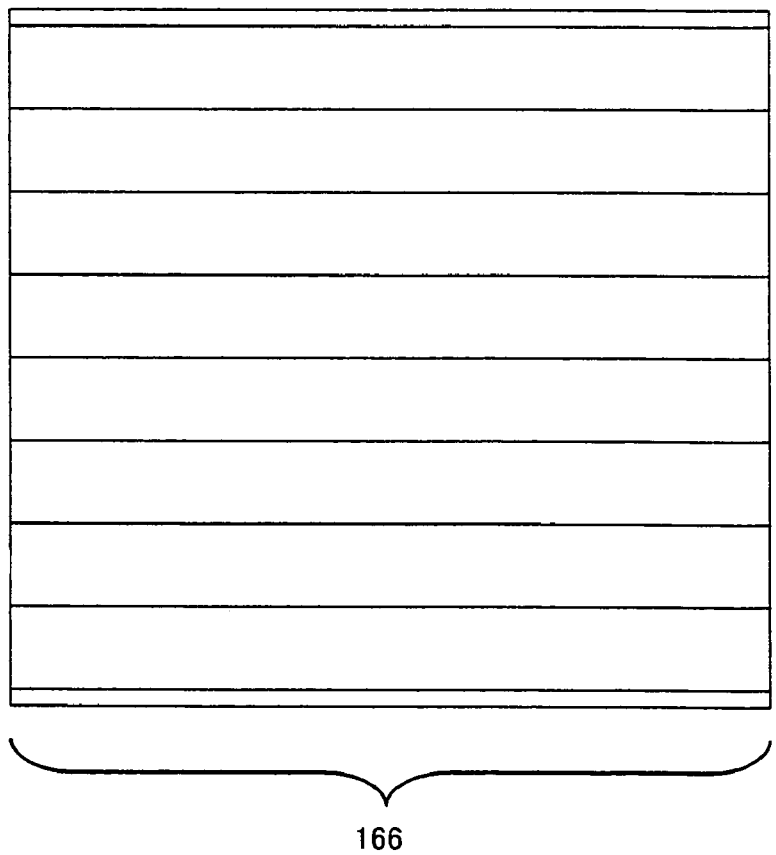
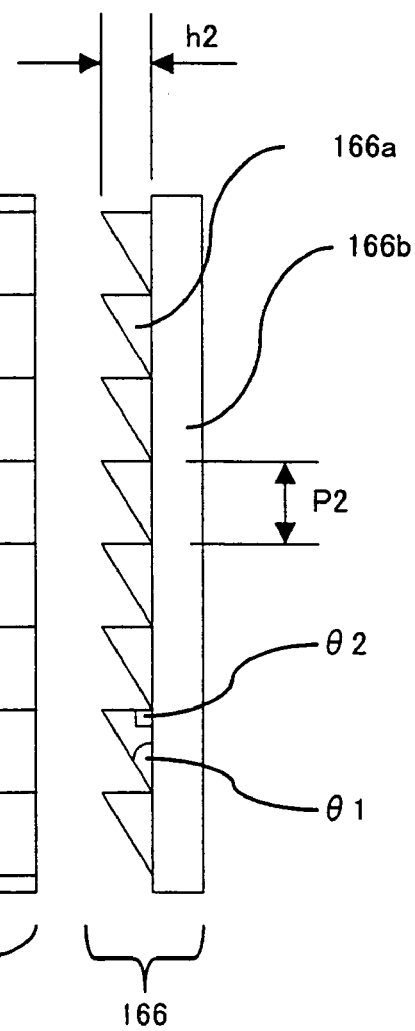

FIG.22A
(PRIOR ART)
FIG.22B
(PRIOR ART)
DRAWING DIRECTION
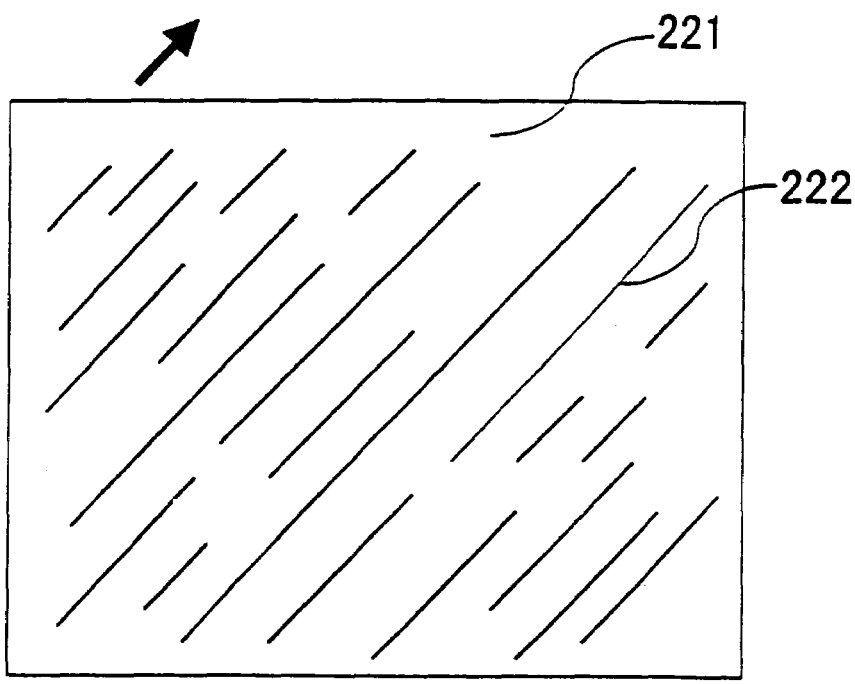
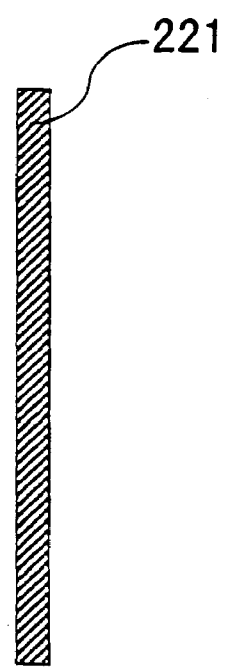

DISPLAY DEVICE INCLUDING ADHESIVE FILM WITH TRANSPARENT SUPPORT

CROSS-REFERENCE TO RELATED APPLICATION

This application is a divisional of application Ser. No. 09/948,567, filed Sep. 10, 2001, now U.S. Pat. No. 6,784,962.

BACKGROUND OF THE INVENTION

1. Field of the Invention

The present invention relates to a method for fabricating a laminate film, and in particular, relates to a method for fabricating a display device (e.g. liquid crystal display device) using a laminate film and having improved viewing angle characteristic.

2. Description of Related Art

Liquid crystal display devices, which typify flat panel displays, have features of being lightweight, thin, and low in power consumption, compared with CRTs, and thus find applications in wide-range fields such as OA apparatus, car-mounted TV sets, car navigation systems, and monitors for video cameras.

A major problem relating to such liquid crystal display devices is that the viewing angle dependence is large. The viewing angle dependence refers to the following phenomenon, for example. When the screen of a display device is viewed from a direction tilting by an angle exceeding a certain angle range, an image that should correctly be displayed in black appears whitish, or reversal in gray scale levels is observed, causing reduction in display quality. From theses viewing directions, the viewer fails to correctly recognize the display image. When the angle range within which the viewer correctly recognizes display image is narrow, it is said that the viewing angle dependence is large.

The viewing angle dependence occurs for various reasons. These include, for example, twist orientation (i.e. helical structure) of liquid crystal molecules (the direction of a helix, the position at which liquid crystal molecules start forming a helix defined by the rubbing direction), the refractive index anisotropy of liquid crystal molecules (difference in retardation in the direction of propagation of light), the characteristics of a polarizing plate (whether or not the selectivity in the light oscillating direction is good), and the directivity of light rays from an area light source.

In general, transmission type liquid crystal display devices are designed, in consideration of the viewing angle dependence described above, so that the position at which the display can be viewed most nicely falls within the range in which the viewer normally views the display. For example, design is made so as to enhance the contrast ratio of the center area in the screen in the direction normal to the plane of the screen or in a somewhat downward direction from the viewer, compared with the surrounding areas in the screen.

By the above construction, however, the viewing angle range is still insufficient. In particular, liquid crystal display devices have large viewing angle dependence in the upward and downward directions with respect to the screen. In order to solve this problem, various methods have conventionally been proposed.

For example, Japanese Laid-Open Patent Publication No. 7-43703 discloses a liquid crystal display device in which a material is filled between a microlens array sheet and a liquid crystal display element. The material has a refractive index equal to or less than the smaller one of the refractive indices of the materials constituting the micro-lens array sheet and the liquid crystal display element.

Japanese Laid-Open Patent Publication No. 10-73808 discloses a liquid crystal display device in which a light diffusing sheet is placed on the front surface of a liquid crystal display element. The light diffusing sheet includes a first diffusion layer containing a light diffusing agent formed on a transparent member and a second diffusion layer having concave and convex portions formed on the first diffusion layer.

In both the above conventional techniques, the microlens array sheet is placed on a polarizing plate constituting the liquid crystal display element. The material having a refractive index which is different from that of the microlense array sheet is provided between the microlenses array sheet and the polarizing plate.

Japanese Laid-Open Patent Publication No. 7-120743 discloses a liquid crystal display device in which convex tip portions of a micro-lens array sheet are in close contact with the surface of a liquid crystal display element.

Japanese Laid-Open Patent Publication No. 9-127309 discloses a liquid crystal display device in which an adhesive layer is formed on convex tip portions of a micro-lens sheet. The ratio of the height A of the convex portion to the thickness B of the adhesive layer (A/B) must be more than 1 and equal to or less than 1000.

Japanese Laid-Open Patent Publication No. 9-194799 discloses a liquid crystal display device in which spacers are placed between a rough surface and an adhesive layer.

In the above conventional techniques, the convex tip portions of the microlens array sheet are partly put in contact with the liquid crystal display element via an adhesive layer, to control the proportion of the contact portion of the lens array to the non-contact portion thereof. In this way, the degrees of transmission and divergence of outgoing light are controlled, and thus the viewing angle characteristic is improved. In either case, the microlens array sheet is placed on the side of the liquid crystal display element closer to the viewer (viewer's side), so that light outgoing from the liquid crystal display element is diffused to the side on which the microlenses are formed (lens formation directions), to attain improvement in viewing angle characteristic.

The above conventional techniques have the following problems.

In general, a pair of polarizing plates are placed on the front and rear surfaces of a liquid crystal display element for controlling the polarizing state before display of images.

The polarizing plates are made of polyvinyl alcohol (PVA) and triacetyl cellulose (TAC). PVA is impregnated with iodine, and the resultant material is drawn in one direction to align the iodine molecules, so that light polarized along the drawn direction is absorbed (or transmitted) and thus the polarizing state of incident light can be aligned in uniform.

During the above drawing, as shown in FIGS. 22A and 22B, fine waves 222 are generated on the surface of a polarizing plate 221 along an absorption axis (or a transmission axis) as the drawn direction. This is due to a miniscule variation in the thickness of the polarizing plate 221 caused by the drawing. These waves do not influence the display when they are observed only through the polarizing plate 221. However, as shown in FIG. 23B, when a light diverging element 235 such as a microlens array sheet is placed on a surface of a polarizing plate 231, in particular, when the light diverging element 235 is bonded to a polarizing plate 231 via an adhesive layer 234, waves 232 generated on the surface of the polarizing plate are magnified. As a result, the display quality greatly deteriorates.

The display quality also greatly deteriorates in the case of using a conventional double-sided adhesive tape as the adhesive layer 234 for bonding with the light diffusing element 235 and the case of using a curable resin as the adhesive layer 234. In these cases, the contact area between the light diffusing element 235 and the adhesive layer 234 is partly changed due to scars formed by hitting with foreign substances generated in the bonding process (concave and convex deformation caused by foreign substances) and deformation caused by external force (by the viewer who touches the lens surface). This partial change in the contact area causes generation of spot defects 233a and bar-shaped defects 233b as shown in FIG. 23A.

No means for solving the above problems have been mentioned in the prior art literature.

An object of the present invention is to provide a laminate film which enables an optical film to bond uniformly to a surface (e.g., surface of a display element), even if the surface has unevenness, a method for fabricating such a laminate film, a display device using such a laminate film, and a method for fabricating such a display device.

SUMMARY OF THE INVENTION

According to the first aspect of the present invention, a method for fabricating a laminate film including a transparent support having two opposing surfaces and an optical film is provided. The optical film is formed on one of the two opposing surfaces of the transparent support via an adhesive layer made of a material of which the cured state changes by application of external energy. The method includes the steps of: applying external energy to the adhesive layer; pressing the optical film against the adhesive layer to stick the optical film and the adhesive layer together; and curing the adhesive layer to a degree of hardness with which the adhesion state between the adhesive layer and the optical film is fixed while the optical film and the adhesive layer are kept stuck together.

In one embodiment of the invention, the adhesive layer is made of an ultraviolet-curable resin.

Preferably, the step of curing the adhesive layer includes the step of leaving the adhesive layer and the optical film standing while the adhesive layer and the optical film are kept stuck together. More preferably, the step of curing the adhesive layer includes the step of leaving the adhesive layer and the optical film standing while the adhesive layer and the optical film are kept stuck together so that the gel fraction of the adhesive layer is 50 wt % or more.

A surface protection film may be provided on the adhesive layer for protecting the adhesive layer, the thickness t of the surface protection film being in a range of $0.035 \text{ mm} \leq t \leq 0.2 \text{ mm}$, and the method may further includes the step of peeling off the surface protection film before the step of pressing the optical film against the adhesive layer.

A rough surface may be bonded to the other of the opposing surfaces of the transparent support via an adhesive layer. Preferably, the rough surface is a surface of a film produced by drawing. The rough surface may include a region having a roughness Rt1 satisfying $Rt1 > 2 \text{ μm}$ when the roughness Rt1 is defined as the distance between the highest crest and the deepest trough within a range of a length evaluated.

Preferably, the transparent support has a roughness Rt2 satisfying $Rt2 \leq 2 \text{ μm}$ when the roughness Rt2 is defined as the distance between the highest crest and the deepest trough within a range of a length evaluated.

The optical film may be a lens sheet having a plurality of lenses formed on at least one surface, and may be pressed against the adhesive layer with the surface having the plurality of lenses facing the adhesive layer. Preferably, the lens sheet is a lenticular sheet having a plurality of semi-cylindrical lenticules arranged in parallel with one another, and the lenticular sheet is pressed against the adhesive layer with a force applied in the direction of the extension of the lenticules with the surface having the plurality of lenticules facing the adhesive layer. Alternatively, the optical film may be a prism sheet having a plurality of prisms.

According to the second aspect of the present invention, a laminate film is provided. The laminate film includes: a transparent support having two opposing surfaces; an adhesive layer formed on one of the two opposing surfaces of the transparent support; and an optical film bonded to the transparent support via the adhesive layer. In the film, the adhesive layer is made of a material of which the cured state changes by application of external energy, and the transparent support has a roughness Rt satisfying $Rt \leq 2 \text{ μm}$ when the roughness Rt is defined as the distance between the highest crest and the deepest trough within a range of a length evaluated.

Preferably, the adhesive layer has a gel fraction of 50 wt % or more.

The optical film may be a lens sheet having a plurality of lenses formed on at least one surface, and may be pressed against the adhesive layer with the surface having the plurality of lenses facing the adhesive layer. The optical film may be a prism sheet having a plurality of prisms.

According to the third aspect of the present invention, a method for fabricating a display device including a display element and an optical film placed on the viewer's side of the display element. The method includes the steps of: producing the display element; and bonding the optical film to the surface of the display element on the viewer's side via an adhesive film; wherein the adhesive film includes a transparent support having a first adhesive layer formed on one of two opposing surfaces, the first adhesive layer being made of a material of which the cured state changes by application of external energy, and the step of bonding the optical film to the surface of the display element on the viewer's side includes the steps of: applying external energy to the first adhesive layer; pressing the optical film against the first adhesive layer to stick the optical film and the first adhesive layer together; curing the first adhesive layer to a degree of hardness with which the adhesion state between the optical film and the first adhesive layer is fixed while the optical film and the first adhesive layer are kept stuck together; and after curing of the first adhesive layer, bonding the other of the two opposing surfaces of the transparent support and the display element via a second adhesive layer.

In a preferred embodiment of the invention, the display element is a liquid crystal display element including a pair of substrates, a liquid crystal material sandwiched between the pair of substrates, and optical characteristic changing means for changing the optical characteristics of incident light placed on at least the viewer's side of the pair of substrates, and the optical film is bonded to the liquid crystal display element by bonding the optical characteristic changing means and the transparent support of the adhesive film together via the second adhesive layer.

The first adhesive layer may be made of an ultraviolet-curable resin.

The step of curing the first adhesive layer may include the step of leaving the first adhesive layer and the optical film standing while the first adhesive layer and the optical film are kept stuck together.

The step of curing the first adhesive layer may include the step of leaving the first adhesive layer and the optical film standing while the first adhesive layer and the optical film are kept stuck together so that the gel fraction of the first adhesive layer is 50 wt % or more.

Preferably, a surface protection film is provided at least on the first adhesive layer for protecting the first adhesive layer, the thickness t of the surface protection film being in a range of 0.035 mm$\leq$t$\leq$0.2 mm, and the method may further include the step of peeling off the surface protection film before the step of pressing the optical film against the first adhesive layer.

Preferably, the surface of the display element to be bonded with the second adhesive layer includes a region having a roughness Rt1 satisfying Rt1>2 μm when the roughness Rt1 is defined as the distance between the highest crest and the deepest trough within a range of a length evaluated.

Preferably, the transparent member has a roughness Rt2 satisfying Rt2$\leq$2 μm when the roughness Rt2 is defined as the distance between the highest crest and the deepest trough within a range of a length evaluated.

The optical characteristic changing means may be a polarizing plate. Alternatively, the optical characteristic changing means may be a phase plate.

The optical film may be a lens sheet having a plurality of lenses, and may be pressed against the first adhesive layer with the surface having the plurality of lenses facing the first adhesive layer.

Preferably, the lens sheet is a lenticular sheet having a plurality of semi-cylindrical lenticules arranged in parallel with one another, and the lenticular sheet is pressed against the first adhesive layer with a force applied in the direction of the extension of the lenticules with the surface having the plurality of lenticules facing the first adhesive layer. Alternatively, the optical film may be a prism sheet having a plurality of prisms.

According to the fourth aspect of the present invention, a method for fabricating a display device including a display element and a lens sheet placed on the viewer's side of the display element is provided. The lens sheet has a plurality of lenticules arranged in parallel with one another. The method includes the steps of: producing the display element; forming an adhesive layer on the viewer's side of the display element; placing the lens sheet so that the lens surfaces of the lenticules face the adhesive layer; and pressing the lens sheet against the adhesive layer by applying a force in the direction of the extension of the lenticules.

Hereinafter, the function of the present invention will be described.

In the method for fabricating a laminate film according to the present invention, after external energy is applied to an adhesive layer made of a material of which the cured state changes by application of external energy, an optical film (e.g., lens sheet) is pressed against the adhesive layer. This process step is carried out while the material is in B stage (intermediate cured state). The adhesive layer is then cured to a degree of hardness with which the adhesion state between the optical film and the adhesive layer no more changes, to thereby complete a laminate film. After this curing step, the material of the adhesive layer is in C stage (completely cured state) or near C stages. In such a laminate film, the adhesion state of the optical film is fixed by a transparent support via the adhesive layer. Therefore, when the laminate film is bonded to a rough surface, the shape of the rough surface is prevented from being transferred to the optical film and influencing the optical characteristics of the optical film. The effect of the present invention is especially great for an optical film having concave and convex portions formed on the surface thereof in contact with the adhesive layer in which the area of the contact region between each convex portion and the adhesive layer influences the optical characteristics of the optical film.

In particular, when the adhesive layer for bonding the optical film and the transparent support together is made of a photocurable resin, the optical film and the transparent support can be easily bonded and fixed together. This reduces generation of defects due to scars and external force.

By placing a surface protection film on the outer surface of the adhesive layer of the adhesive film and setting the thickness t of the surface protection film in the range of 0.035 mm$\leq$t$\leq$0.2 mm, the adhesive layer is prevented from deforming due to existence of foreign matters and external force before curing. As a result, bonding between the light diverging element and the transparent member is facilitated.

The method for fabricating a display device according to the present invention also has the function described above in relation with the method for fabricating a laminate film. In particular, in the case of using a liquid crystal display element as the display element, waves tend to be generated on the surface of a polarizing plate or a phase plate of the display element. When an optical film is bonded to the polarizing plate or the phase plate in an attempt to improve the characteristics of the display element, the waves of the polarizing plate or the phase plate are transferred to the optical film. According to the fabrication method of the present invention, however, the laminate film is bonded to the display element after the adhesive layer is cured to a degree that the adhesion state between the optical film and the adhesive layer no more changes. Therefore, it is possible to prevent the uneven surface of the display element from influencing the optical film, and thus prevent deterioration in display quality. In particular, when a lens sheet as the optical film is bonded to a liquid crystal display element by the fabrication method according to the present invention, the resultant liquid crystal display device can exhibit high display quality with an improved viewing angle characteristic.

By placing a surface protection film on the outer surface of the adhesive layer formed on the transparent support and setting the thickness t of the surface protection film in the range of 0.035 mm$\leq$t$\leq$0.2 mm, the adhesive layer is prevented from deforming due to existence of foreign matters and external force before curing. As a result, bonding between the optical film and the transparent support is facilitated. In particular, spot defects and bar-shaped defects influence the optical performance of the light diverging element. A defect having a diameter of 0.1 mm or more will be observed as a panel defect, causing significant deterioration in display quality.

By controlling the thickness of the surface protection film, the number of spot defects and bar-shaped defects can be markedly reduced. For example, while the number of defects is 200 pieces/m$^2$ when the thickness of the surface protection film is 0.02 mm, it can be as small as 50 pices/m$^2$ when the thickness is 0.035 mm. For a 20-inch liquid crystal display device, for example, about 25 defects can be reduced to 10 pieces or less. The display quality therefore improves.

Although a thicker surface protection film can reduce the number of defects, it increases the cost since the material cost is higher. Therefore, the thickness is preferably 0.2 mm or less.

BRIEF DESCRIPTION OF THE DRAWINGS

FIGS. 3A and 3B are views illustrating a lens sheet in Embodiment 1 of the present invention.

FIGS. 16A and 16B are views illustrating a prism sheet in Embodiment 2 of the present invention.

FIGS. 22A and 22B are views illustrating waves on a polarizing plate.

DETAILED DESCRIPTION OF THE INVENTION

The present inventors have found out for the first time that the prior art problem described above, that is, the problem that the display quality greatly deteriorates when a light diverging element such as a microlens array sheet is placed on the surface of a polarizing plate, occurs due to the fact that waves on the polarizing plate influence the contact state between the concave and convex shaped surface of the microlens array sheet and an adhesive layer. The present invention has been achieved based on this finding.

Hereinafter, embodiments of the present invention will be described with reference to the relevant drawings.

EMBODIMENT 1

Figure 1:
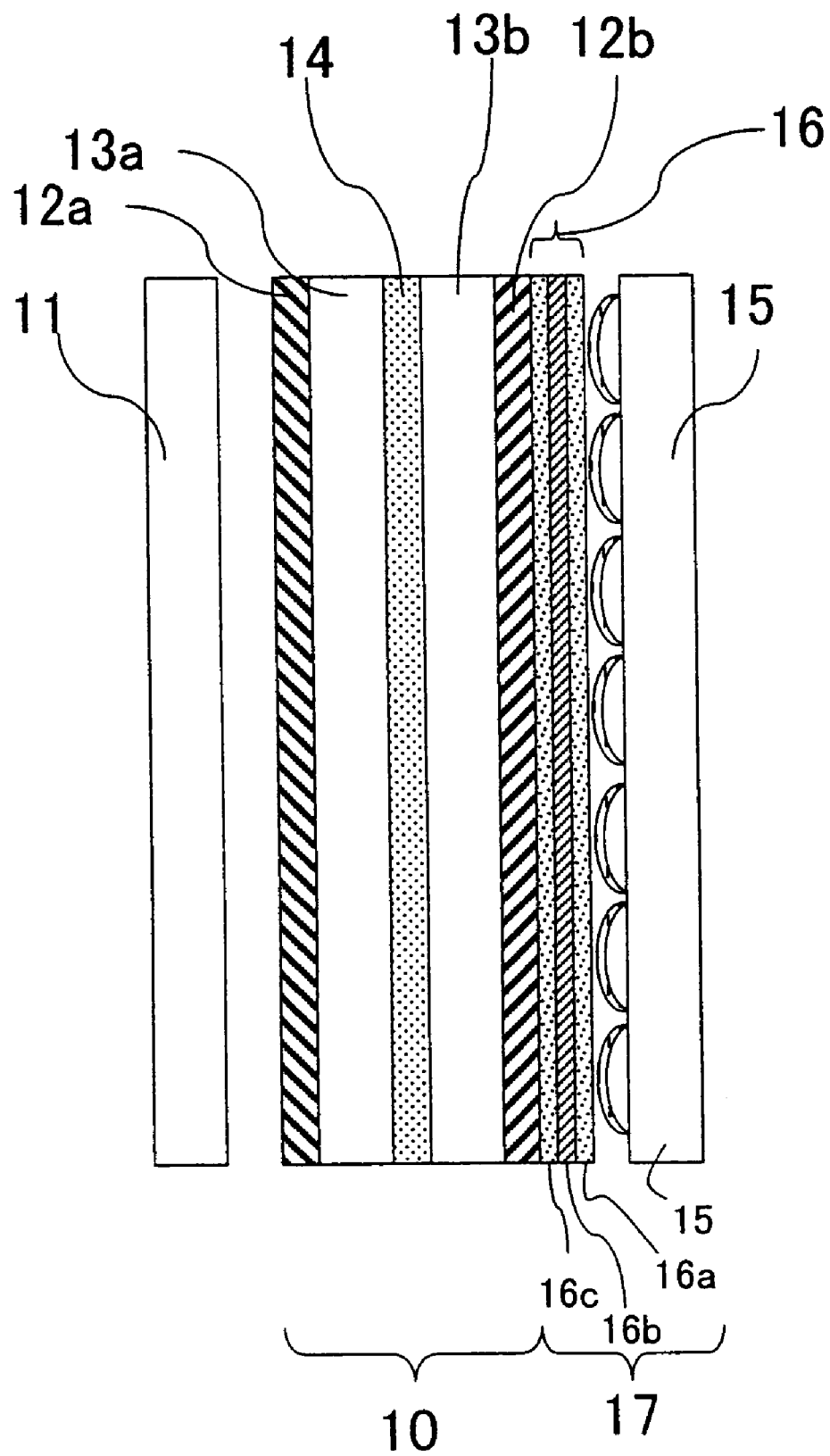
FIG. 1 is a schematic illustration of a liquid crystal display device in Embodiment 1 of the present invention.

FIG. 1 is a cross-sectional view of a liquid crystal display device used in Embodiment 1 of the present invention. Referring to FIG. 1, the liquid crystal display device in this embodiment includes a surface illuminant 11, a liquid crystal display element 10 and a laminate film 17 which includes an adhesive film 16, and a lens sheet (lens film) 15 as an optical film.

The liquid crystal display element 10 essentially includes: an active matrix substrate 13a including thin film transistors (TFTs), transparent pixel electrodes, and the like formed in a matrix on a transparent substrate made of glass or plastic; a counter substrate 13b including transparent electrodes and color filters formed on a transparent substrate made of glass or plastic; liquid crystal material 14 as a display medium sealed in a space between the two substrates; and a pair of polarizing plates (polarizing films) 12a and 12b placed to sandwich the two substrates.

Figure 2A:
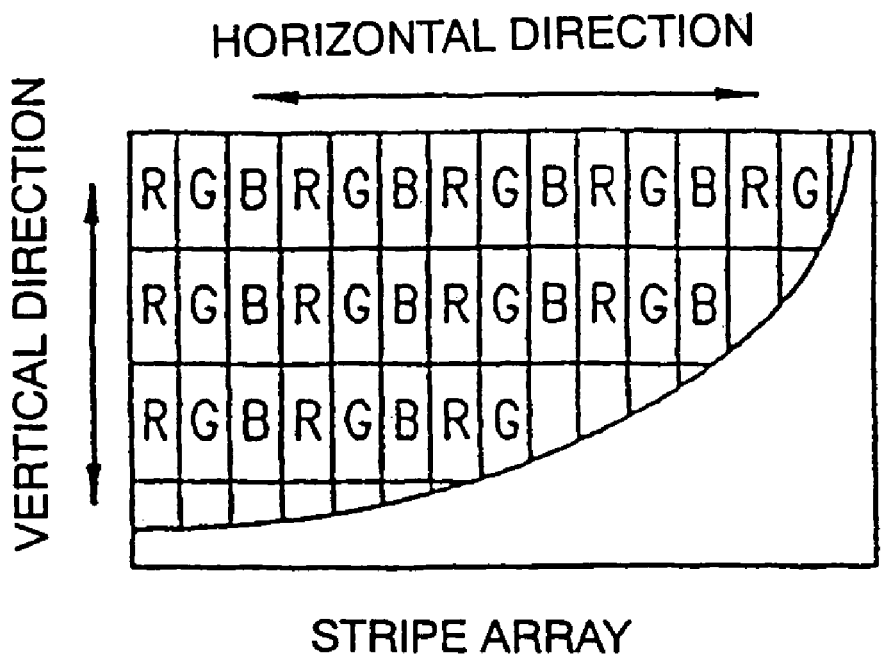
FIGS. 2A and 2B are views of examples of arrangement of R, G, and B pixels.

In this embodiment, twisted nematic (TN) liquid crystal material having a twist angle of 90 degrees was used as the liquid crystal material 14. As the liquid crystal display element 10, various types different in the number of pixels and the size are available. In this embodiment, used was a liquid crystal display element having a screen size of 20 inches in a diagonal line (304.8 mm×406.4 mm), a stripe array of R, G, and B pixels shown in FIG. 2A with the number of pixels of 640 (each of R, G, B) horizontally×480 vertically, and a horizontal pixel pitch Ph of 0.212 mm and a vertical pixel pitch Pv of 0.635 mm.

The color filters are not necessarily provided on the counter substrate 13b. For example, it may be formed on the pixel electrodes of the active matrix substrate 13a.

On the outer surface of the polarizing plate 12b located on the viewer's side of the liquid crystal display element 10, the lens sheet 15 is placed via the adhesive film 16 including an adhesive layer (first adhesive layer) 16a, a transparent support 16b, and another adhesive layer (second adhesive layer) 16c.

In this embodiment, as the lens sheet 15, used was a lenticular sheet having a plurality of semi-cylindrical lenticules arranged in rows. Note that the lens sheet denoted by the reference numeral 30 in FIG. 3 is the same as the lens sheet 15 in FIG. 1. The lenticular sheet 30 was positioned so that the lenticules extend in parallel with the horizontal (lateral) direction of the screen of the liquid crystal display element.

In this embodiment, the lenticular sheet 30 was produced in the following manner. First, an ultraviolet-curable resin (Z9001, refractive index n=1.59) manufactured by JSR Co., Ltd. was dropped in a mold in a shape of repeated concave portions. The ultraviolet-curable resin was then irradiated with 1.0 J/cm² ultraviolet light, to thereby transfer and form repeated convex portions on a base plate 33. As the base plate 33, an ARTON film manufactured by Japan Synthetic Rubber Co., Ltd. was used. In this way, a lenticular sheet having a pitch P1 of 0.05 mm and a height h of 0.015 mm was produced.

A light-shading layer 32 was formed over the entire surface of lenticules 31 for prevention of surface reflection of the lenticular sheet 30. More specifically, the light-shading sheet 32 was formed in the following manner. An organic material containing a black pigment dispersed therein was applied to the lenticules 31 by printing. The organic material was then irradiated with 1.5 J/cm² ultraviolet light and cured. The thickness of the light-shading layer 32 was controlled to be about 0.005 mm so that the total light transmittance of the lenticular sheet 30 was 70%.

Although the luminance of the liquid crystal display device increases as the total light transmittance is higher, reduction in the luminance of the liquid crystal display device is negligibly small as long as the total light transmittance is 50% or more.

Figure 4:
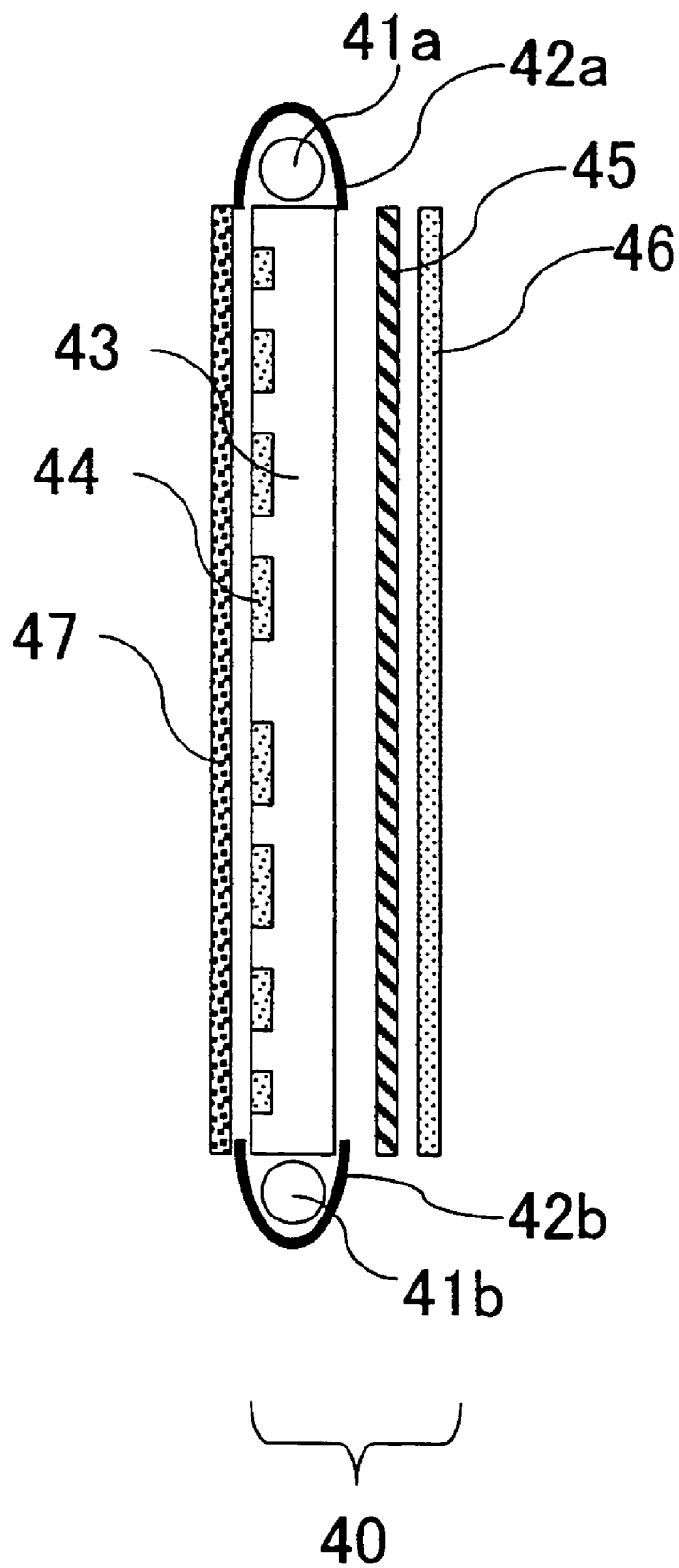
FIG. 4 is a view illustrating a surface illuminant in Embodiment 1 of the present invention.

FIG. 4 illustrates the surface ruminant used in this embodiment. In FIG. 4, the surface luminant 11 in FIG. 1 is denoted by the reference numeral 40.

The surface luminant 40 used in this embodiment is of a side lighting type, which is essentially constructed of cold-cathode tubes 41a and 41b, reflectors 42a and 42b surrounding the cold-cathode tubes 41a and 41b, a diffusion reflection sheet 47, a light conductor 43 with silk printing 44 formed thereon, a diffusing sheet 45 placed on the light outgoing side, and a DBEF film 46 (manufactured by 3M Ltd.). The surface ruminant 40 having the above construction can be produced by a know method, and thus the description thereof is omitted here.

Next, the laminate film used in this embodiment will be described.

The lens sheet 15 is bonded to the polarizing plate 12b of the liquid crystal display element on the viewer's side as shown in FIG. 1. In this bonding, if an adhesive layer such as a two-sided adhesive tape is first formed on the polarizing plate 12b and then the lens sheet 15 is bonded to the adhesive layer, unevenness of the surface of the polarizing plate 12b, in particular, waves on the surface are transferred to the optical film, and the influence of the unevenness is reflected on the surface of the lens sheet 15, resulting in variation in optical characteristics.

In particular, in this embodiment, the lens sheet is placed so that the concave and convex portions face the adhesive layer and the lens tips are buried in the adhesive layer. Since a normal adhesive layer has a refractive index similar to that of the lens sheet material, the lens tips buried in the adhesive layer no more function as a lens satisfactorily. To state differently, the contact region between an air layer existing between the lens sheet and the adhesive layer and the lens sheet serves to generate refraction required for lens effect. Therefore, the size and in-plane uniformity of the contact areas between the lens tips and the adhesive layer greatly influence the lens characteristics.

In view of the above, if the contact area between the lens tip and the adhesive layer is relatively large in some portion of the lens sheet, while it is relatively small in the other portion of the lens sheet, the optical characteristics (lens characteristics) of the lens sheet are distorted in the screen plane.

If the concave and convex surface of the optical sheet is directly bonded to the uneven surface of the backing layer such as the polarizing plate via the adhesive layer as described above, the surface unevenness (waves) of the polarizing plate causes variation in the contact areas between the lens tips of the lens sheet and the adhesive layer in the sheet plane. As a result, the lens characteristics of the lens sheet are distorted reflecting the unevenness and waves of the backing layer.

To prevent the above problem, in this embodiment, the transparent support 16b having a predetermined flatness and the lens sheet 15 are pressed against each other via the adhesive layer 16a. The adhesive layer 16a is then cured to a predetermined hardness, that is, to a degree of hardness with which the adhesion state between the optical film and the adhesive layer no more changes. Thereafter, the resultant laminate film of the lens sheet 15 and the transparent support 16 bonded together is bonded to the polarizing plate via the adhesive layer 16c. Thus, the contact state between the lens sheet 15 and the adhesive layer 16a can be kept constant by the transparent support 16b having a predetermined flatness. Therefore, when the laminate film including the lens sheet 15 is bonded to the polarizing plate in the subsequent process, the contact state between the lens sheet 15 and the adhesive layer 16a is prevented from being influenced by the unevenness such as waves on the surface of the polarizing plate, and thus the characteristics of the optical film are not distorted.

The flatness of the transparent support will be described.

Table 1 below shows the results of examination by the present inventors on the influence of the surface flatness (roughness) of the backing film on the optical film when the optical film is bonded to the backing film.

TABLE 1

| Roughness of backing Rt | Influence of backing |
| --- | --- |
| Rt > 2 μm | X not acceptable |
| 2 μm ≧ Rt ≧ 1.5 μm | Δ acceptable |
| 1.5 μm > Rt > 1 μm | ○ good |
| 1 μm ≧ Rt | ⊙ excellent |

The flatness (roughness) Rt is defined as the distance between the highest crest and the deepest trough within the range of a length evaluated. As is found from Table 1, when the roughness Rt of the backing film is 2 μm or less, the influence of the surface shape of the backing film on the optical characteristics of the optical film is acceptable. In the fabrication method of the present invention, therefore, the transparent support is made of a material having a roughness Rt of 2 μm or less. As is also found from Table 1, the roughness Rt is preferably less than 1.5 μm, more preferably equal to or less than 1 μm.

On the contrary, a film produced by drawing a material in one direction, such as a polarizing plate and a phase plate, may have a region having a roughness Rt exceeding 2 μm due to generation of waves on the surface and the like. A plastic substrate, also, may have a region having a roughness Rt exceeding 2 μm. Moreover, even when the roughness Rt of the surface to which the optical film is to be bonded (surface of a polarizing plate and a phase plate) is less than 2 μm, an adhesive layer formed for adhesion of the optical film may have a scar or deformation due to external force exceeding 2 μm. For these reasons, the method for fabricating a laminate film of the present invention is especially effective for the case of bonding the optical film to a surface that may include a region having a roughness Rt exceeding 2 μm.

Hereinafter, referring to FIGS. 5A to 5D, 6A to 6D, 7A and 7B, and 8A and 8B, a method for fabricating a laminate film and a method for fabricating a display device according to the present invention will be described.

Figure 5A:
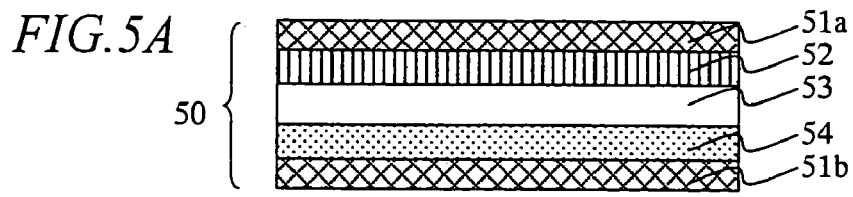
FIGS. 5A, 5B, 5C, and 5D are views illustrating a fabrication process for the liquid crystal display device in Embodiment 1 of the present invention.
Figure 5A:
Figure 5B:
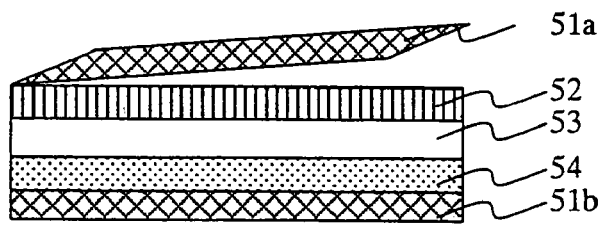
Figure 5B:

FIG. 5A shows a cross-section of an adhesive film 50 in the state prior to the bonding with the optical film. The adhesive film 50 includes a transparent support 53 for supporting the optical film in the flat state, and adhesive layers 52 and 54 formed on both surfaces of the transparent support 53. Transparent separators (surface protection film) 51a and 51b are formed on the outer surfaces of the adhesive layers 52 and 54 for protecting these layers. At least the adhesive layer 52, out of the adhesive layers 52 and 54, to which the optical film is to be bonded, is made of a material of which the cured state changes by application of external energy, such as a photocurable resin. Note that the adhesive layers 52, 54, the transparent support 53 in FIG. 5A correspond to the adhesive layers 16a, 16c and the transparent support 16b in FIG. 1.

In this embodiment, a PET film having a thickness of 0.075 mm was used as the transparent support 53. The thickness of the transparent support 53 is preferably in the range of about 25 μm to about 200 μm in view of an ease of handling. A photocurable resin was used for the adhesive layer 52. A postcurable UV (ultraviolet) resin is preferably used as the photocurable resin for the adhesive layer 52. The postcurable UV resin is, for example, disclosed in Japanese Laid-Open Patent No. 9-279103 (Sekisui Chemical Co., Ltd.), the contents of which are hereby incorporated by reference. The curing reaction (e.g., cationic polymerization) of the postcurable UV resin is initiated by an irradiation of ultraviolet light, and the reaction proceeds slowly at the room temperature. Accordingly, while the curing reaction proceeds, that is, before the resin is completely cured, an object (e.g., lens sheet) can be adhered to the adhesive layer 52 without being fixed. An acrylic resin was used for the adhesive layer 54. As the transparent 51a and 51b, a PET film having a thickness of 0.05 mm was used.

The transparent separators 51a and 51b are formed to prevent defects from occurring due to existence of foreign matters generated in the processes of bonding to the lens sheet and bonding to the polarizing plate to be described later, and are peeled off immediately before these bonding processes. The thickness of the separators 51a and 51b is not limited to that described above, but is determined so as to minimize the number of defects due to scars.

Table 2 below shows the thickness of the separators and the density of defects having a diameter of 0.1 mm or more.

TABLE 2

| Thickness of separator (mm) | Density of defects (pcs./m²) | Number of defects (pcs.) | Evaluation of appearance |
|---|---|---|---|
| 0.02 | 200 | 25 | X not acceptable |
| 0.03 | 125 | 15 | X not acceptable |
| 0.035 | 50 | 6 | Δ acceptable |
| 0.045 | 20 | 3 | ○ good |
| 0.05 | 10 | 1 | ⊚ excellent |
| 0.20 | 2 | 0 | ⊚ excellent |

As shown in Table 2, the density of defects due to scars changes by changing the thickness of the separators, and the number of defects changes with the screen size. In the case of a liquid crystal display element having a screen size of 20 inches in a diagonal line, the number of defects is as large as 25 pieces when the thickness of the separators is 0.020 mm. The display quality is deteriorated with such a large number of defects. When the thickness of the separators is increased to 0.035 mm or more, the number of defects can be reduced to 10 pieces or less, which falls within the range in which no influence is recognized in appearance.

The adhesive film 50 having the above construction is bonded to the lens sheet in the following manner.

Figure 5C:
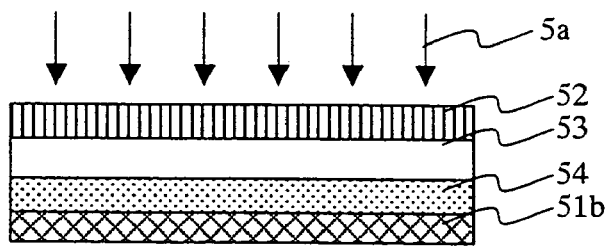
Figure 5C:

First, the separator 51a covering the adhesive layer 52 made of a photocurable resin is peeled off (FIG. 5B), and the adhesive layer 52 is irradiated with light 5a (FIG. 5C). The reason why the adhesive layer 52 is irradiated with light after the separator is peeled off is to enhance the light sensitivity of the adhesive layer. Alternatively, the irradiation with ultraviolet light may be performed before the separator is peeled off. In this case, however, the irradiation must be performed in consideration of absorption of ultraviolet light by the separator (about 20%). In this embodiment, a metal halide lamp was used to irradiate the adhesive layer with the ultraviolet light 5a. The amount of irradiation was 1.6 J/cm².

Figure 5D:
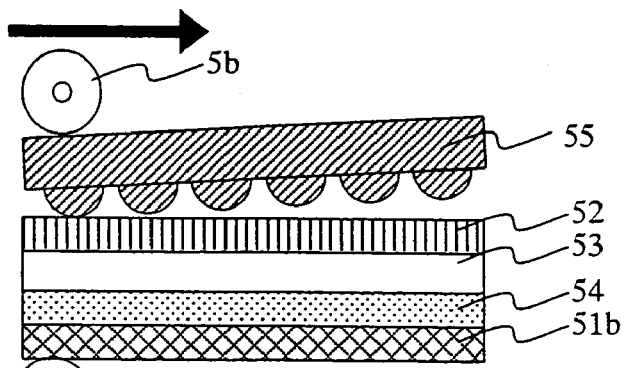
Figure 5D:
Figure 6A:
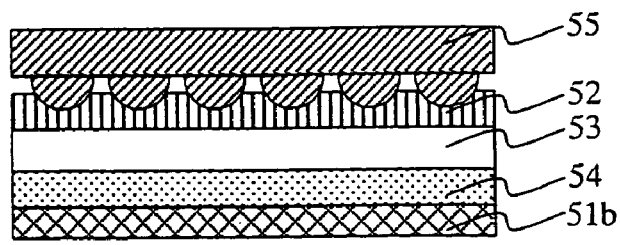
FIGS. 6A, 6B, 6C and 6D are views illustrating the fabrication process for the liquid crystal display device in Embodiment 1 of the present invention.
Figure 6B:
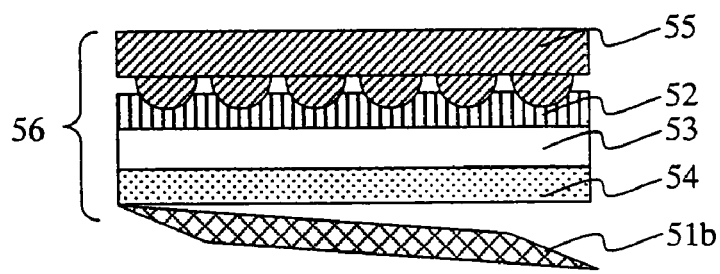

Next, the lens sheet 55 is pressed against the adhesive layer 52. In this step, the material of the adhesive layer 52 is in B stage (intermediate cured state). In this embodiment, as shown in FIG. 5D, a roll-to-roll method using rollers 5b and 5c was employed to press the lens sheet 55 against the adhesive layer 52. The adhesive layer 52 is then cured to a degree of hardness with which the lens sheet 55 is fixed to the transparent support 53 via the adhesive layer 52. After this curing step, the material of the adhesive layer 52 is in C stage (completely cured state) or near C stage. In this embodiment, the adhesive layer 52 was cured by leaving the adhesive layer 52 standing at room temperature for 24 hours together with the lens sheet 55 kept pressed against the adhesive layer 52. In this way, a laminate including the adhesive film and the lens sheet is obtained (FIG. 6A).

The process of curing the adhesive layer 52 will be described.

The gel fraction of the adhesive layer 52 changes depending on the material, the curing conditions, and the like. Depending on the gel fraction, the degree of deterioration in display quality due to the transfer of waves on the polarizing plate to the lens sheet changes. Table 3 below shows the relationship between the gel fraction and waves on the polarizing plate.

TABLE 3

| Gel fraction (wt %) | Wave on polarizing plate |
|---|---|
| 30 | X not acceptable |
| 40 | X not acceptable |
| 50 | Δ acceptable |
| 60 | ○ good |
| 70 | ○ good |
| 80 | ⊚ excellent |
| 90 | ⊚ excellent |
| 95 | ⊚ excellent |

From Table 3, it is found that when the gel fraction is 50 wt % or more, the influence of waves on the surface of the polarizing plate can be suppressed and thus acceptable display quality is obtained. In this embodiment, the adhesive layer 52 was cured until the gel fraction of 75% wt % was obtained by leaving the adhesive layer 52 standing at room temperature for 24 hours.

The gel fraction was measured in the following manner. First, the weight w1 of a portion of the adhesive layer as a sample left for 24 hours after light irradiation was measured (w1=0.1 g in this example), and the sample was immersed in ethyl acetate (50 cc) for 12 hours. The ethyl acetate with the sample was then filtered, dried (at 110° C. for 30 minutes), and then left standing at room temperature for 30 minutes. The weight w2 of the resultant gelled sample was measured, and w2/w1×100 wt % was calculated to obtain the gel fraction.

Figure 6C:
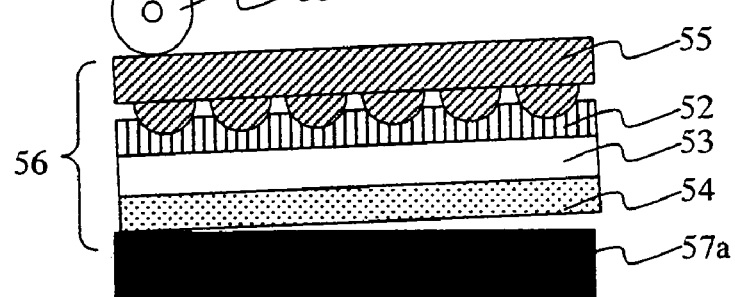
Figure 6D:
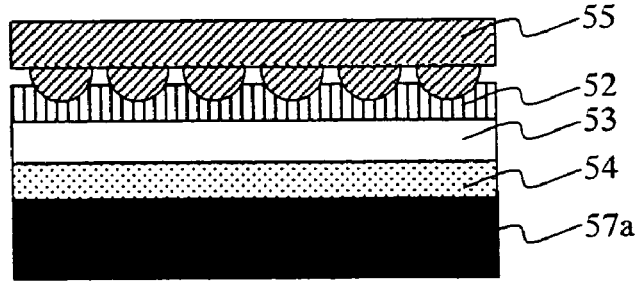

The other separator 51b is then peeled off (FIG. 6B), a laminate film 56 is provided, and the laminate film 56 is bonded to a polarizing plate 57a. In this embodiment, as shown in FIG. 6C, the adhesive layer 54 and the polarizing plate 57a were pressed against with each other using the rollers 5b and 5c.

Figure 7A:
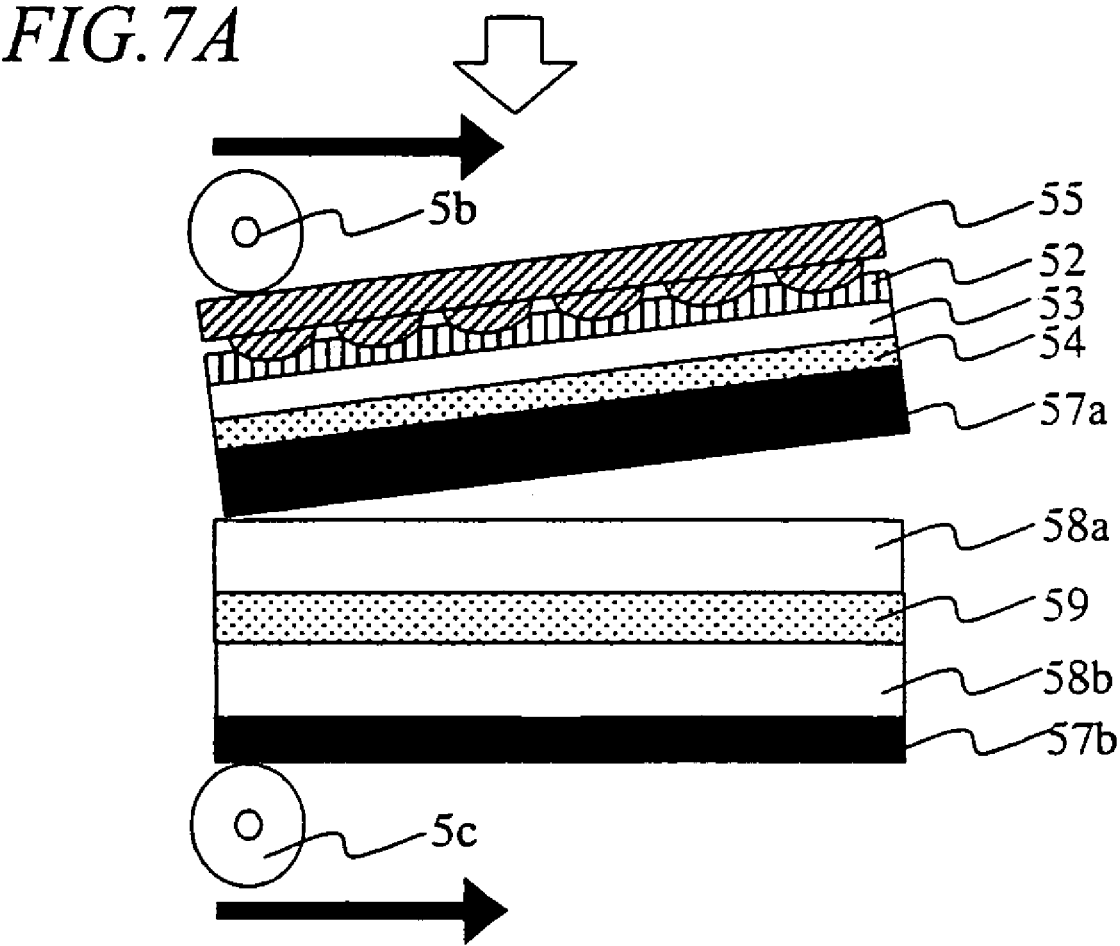
FIGS. 7A and 7B are views illustrating the fabrication process for the liquid crystal display device in Embodiment 1 of the present invention.
Figure 7B:
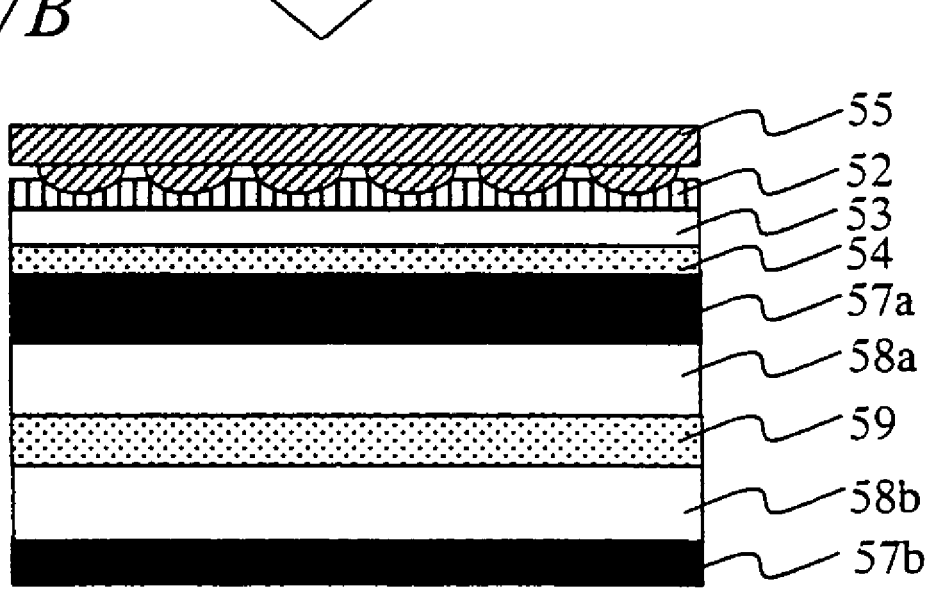

Finally, the polarizing plate 57a bonded with the laminate film 56 (see FIG. 6D) is bonded to the liquid crystal display element. In this embodiment, as shown in FIG. 7A, the polarizing plate 57a was pressed against a substrate 58a of the liquid crystal display element on the viewer's side using the rollers 5b and 5c. In this way, as shown in FIG. 7B, there is attained a liquid crystal display device having a construction where the polarizing plates 57a and 57b are placed on the outer surfaces of the pair of substrates 58a and 58b sandwiching a liquid crystal material 59 as a display medium, and the lens sheet 55 is placed on the outer surface of the polarizing plate 57a located on the viewer's side of the liquid crystal display element via the adhesive film.

Figure 8A:
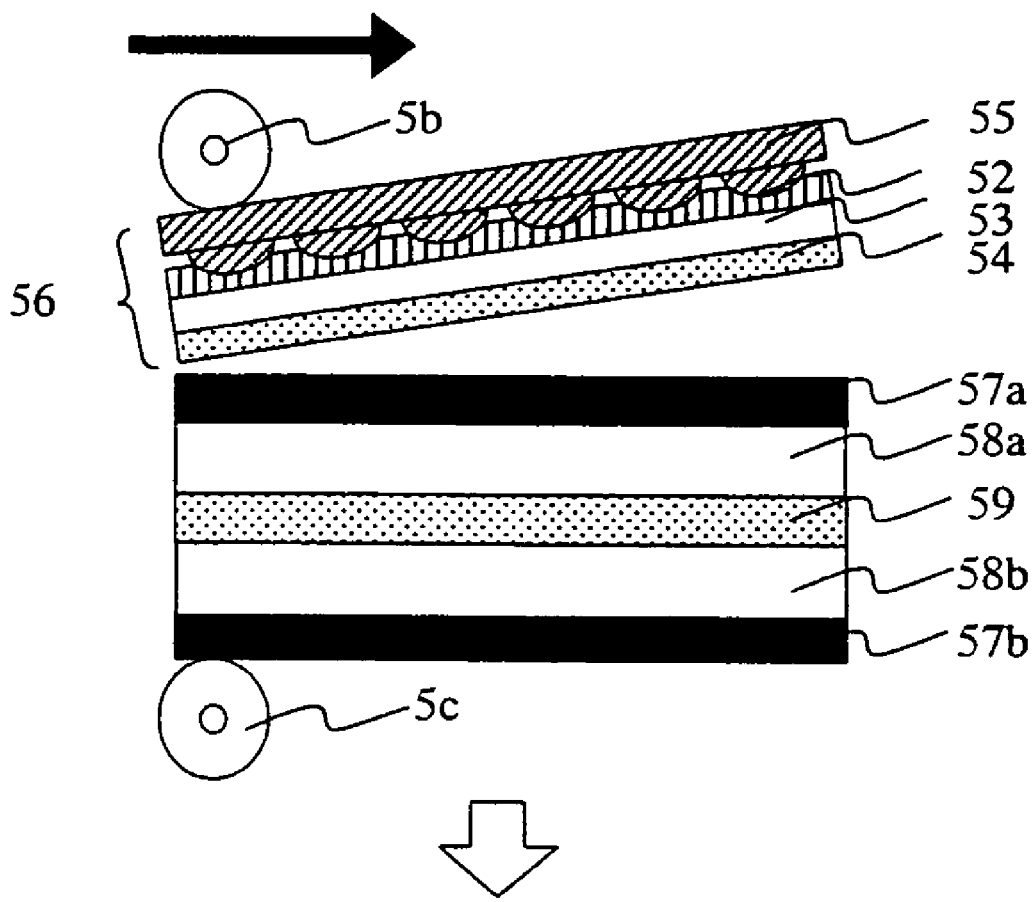
FIGS. 8A and 8B are views illustrating a modification of the fabrication process for the liquid crystal display device in Embodiment 1 of the present invention.
Figure 8B:
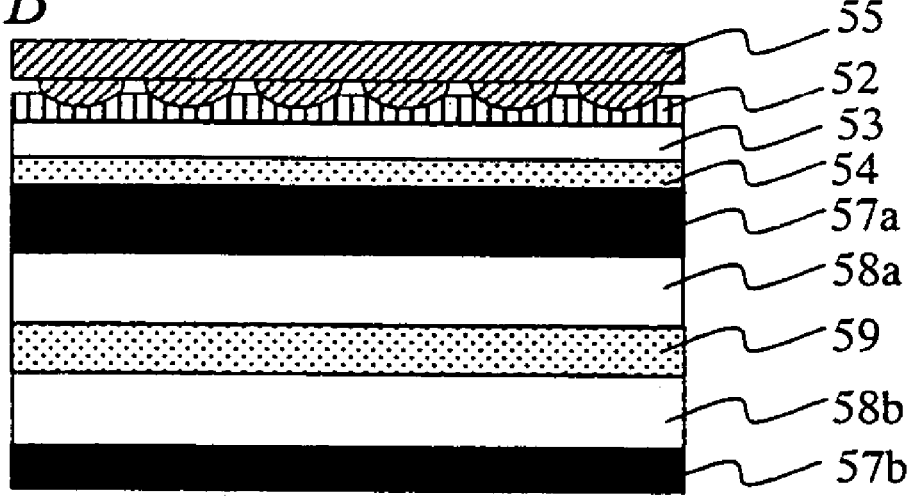

The process of bonding the lens sheet to the polarizing plate and the liquid crystal display element is not limited to that described above. Any other process may be adopted as long as the lens sheet can be fixed to the adhesive film 50 before the lens sheet 55 is bonded to the polarizing plate 57a by pressing the lens sheet 55 against the adhesive film 50 and curing the adhesive layer 52 in the adhesive film 50 so sufficiently that no change is allowed in the adhesion state between the lens sheet 55 and the adhesive layer 52. By fixing the lens sheet 55 as described above, it is possible to reduce the occurrence that the uneven surface of the polarizing plate 57a, in particular, waves on the surface thereof change the in-plane distribution of the optical characteristics of the optical film and thus adversely influence the display quality when the lens sheet 55 is bonded to the polarizing plate 57a via the adhesive film 50 in a subsequent process. Therefore, the bonding process may proceed as shown in FIGS. 8A and 8B, for example, where the polarizing plate 57a is previously bonded to the substrate 58a of the liquid crystal display element on the viewer's side, and then the laminate film 56 including the lens sheet 55 and the adhesive films and so on is pressed against the polarizing plate 57a.

The adhesive layer 54 may be formed on the surface of the polarizing plate 57a, not on the transparent support 53 of the adhesive film 50. In this case, also, the lens sheet 55 and the adhesive film 50 are bonded to each other, and after the adhesive layer 52 is cured sufficiently so that the lens sheet 55 can be fixed to the adhesive layer 52 in a desired adhesion state, the resultant laminate of the lens sheet 55 and the adhesive film 50 is bonded to the polarizing plate 57a. By this process, also, it is possible to reduce the occurrence that the uneven surface of the polarizing plate 57a, in particular, waves on the surface thereof adversely influence the surface of the lens sheet 55.

As described above, by pressing the lens sheet 55 against the adhesive layer 52 of the adhesive film 50 and then curing the adhesive layer 52 sufficiently, the concave and convex shape of the lens array formed on the lens sheet 55 can be fixed to the transparent support 53, and thus the lens surface is prevented from deformation by external force. In addition, by curing the adhesive layer 52 sufficiently, the adhesion state of the lens sheet 55 is reliably fixed by the transparent support 53. By this fixation, when the polarizing plate 57a is bonded to the surface of the transparent support 53 of the adhesive film 50 on the side opposite to the lens sheet 55, the lens surface is prevented from being influenced by waves on the polarizing plate 57a, and thus the display quality can be improved.

Figure 9:
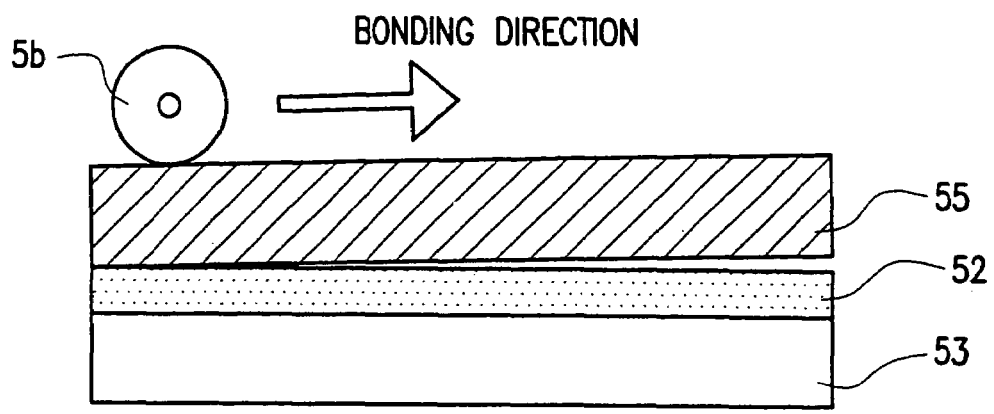
FIG. 9 is a view illustrating the roller moving direction in the process of pressing the lens sheet against an adhesive layer.
Figure 10:
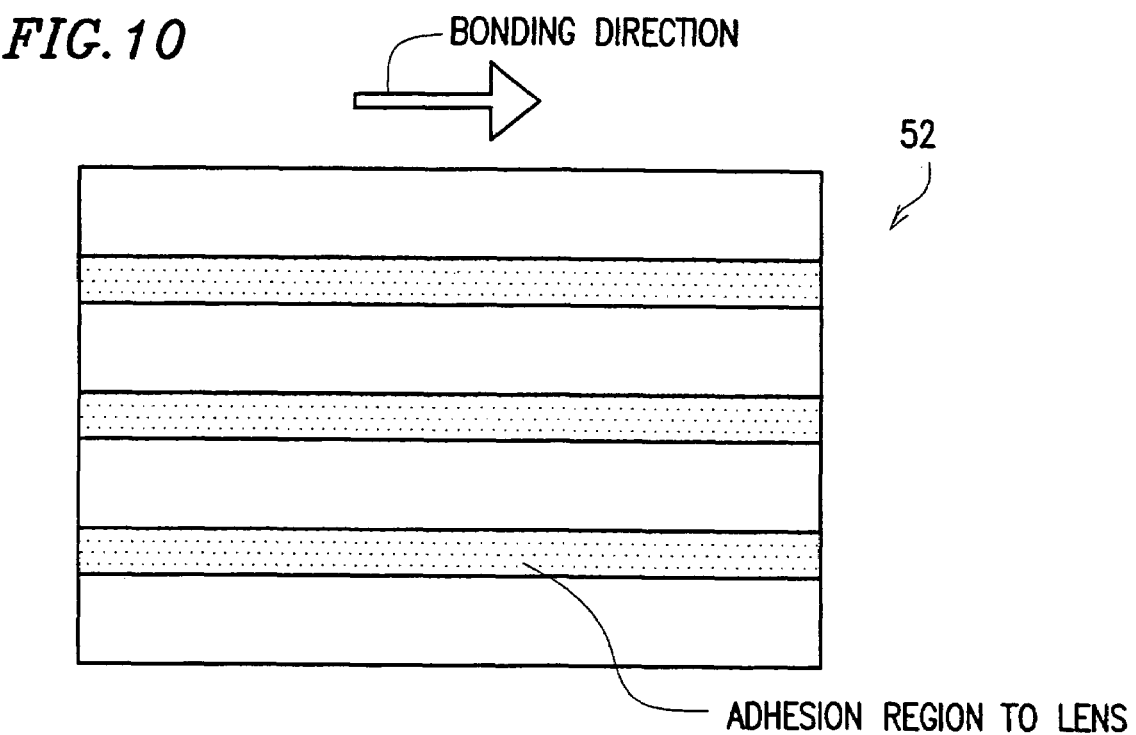
FIG. 10 is a view illustrating the roller moving direction in the process of pressing the lens sheet against the adhesive layer.
Figure 11:
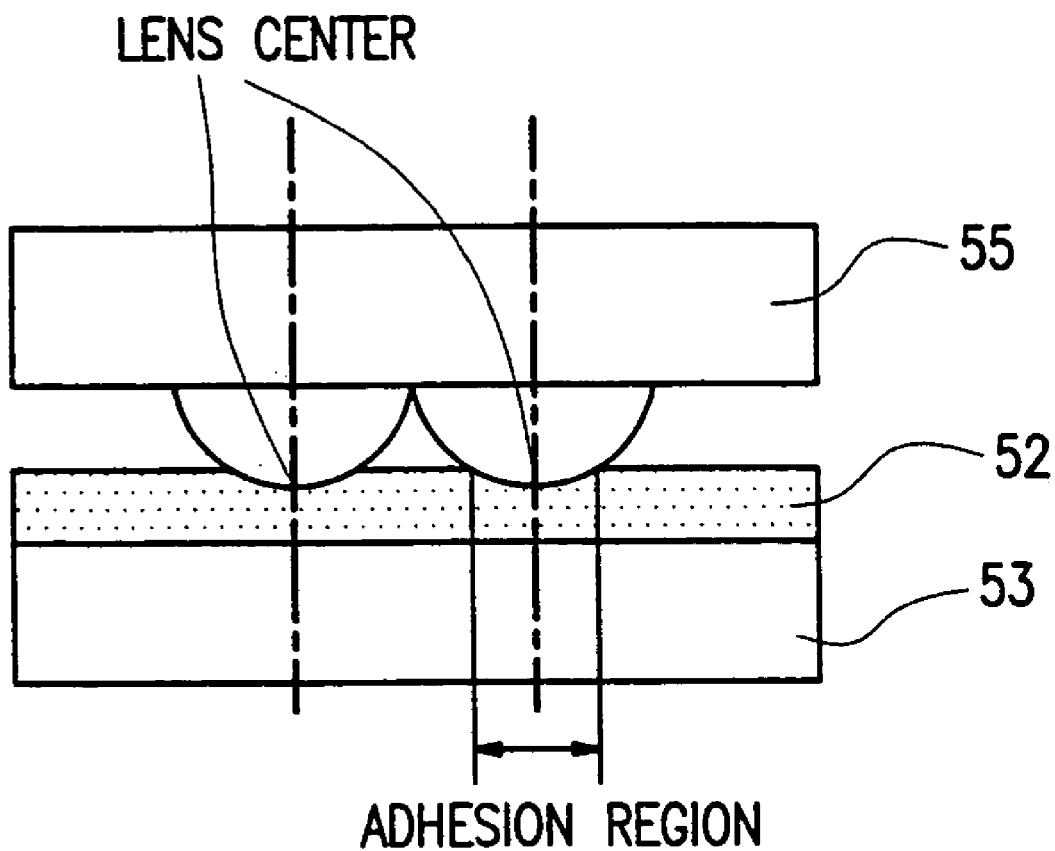
FIG. 11 is a schematic illustration of the adhesion state between lens convex portions of the lens sheet and the adhesive layer.

In FIG. 5D, the direction of the movement of the rollers 5b and 5c (bonding direction) is vertical to the direction of the extension of the lenticules. The roller movement direction is not limited to this, but may be in parallel with the direction of the extension of the lenticules. An example of the latter case is shown in FIGS. 9 and 10. FIG. 9 shows a cross-sectional view of the lens sheet 55, the adhesive layer 52, and transparent support 53, and FIG. 10 shows a plan view of the adhesive layer 52, both of which illustrate the roller moving direction in the process of pressing the lens sheet 55 against the adhesive layer 52. As shown in FIGS. 9 and 10, a pressure is applied on the lens sheet 55 with the roller 5b in the direction in parallel with the extension of the lenticules. By this pressing, uniform pressure is applied outward from the center of the convex portion of each lenticule (in the direction vertical to the extension of the lenticules). As a result, as shown in FIG. 11, each adhesion region of the lens of the lens sheet 55 to the adhesive layer 52 can be a region symmetrical with respect to the center of the lens convex portion and thus the viewing angle characteristic can be expanded symmetrically. It should be noted that in the steps shown in FIGS. 7A and 8A, since the contact state between the lens sheet 55 and the adhesive layer 52 has already been fixed, the shape of the lens convex portions does not change in particular in whichever direction the pressure is applied with the roller.

The luminance characteristic and the viewing angle characteristic of the liquid crystal display device in this embodiment fabricated as described above were compared with a conventional liquid crystal display device having no lens sheet. The results are shown in FIGS. 12 and 13.

Figure 12:
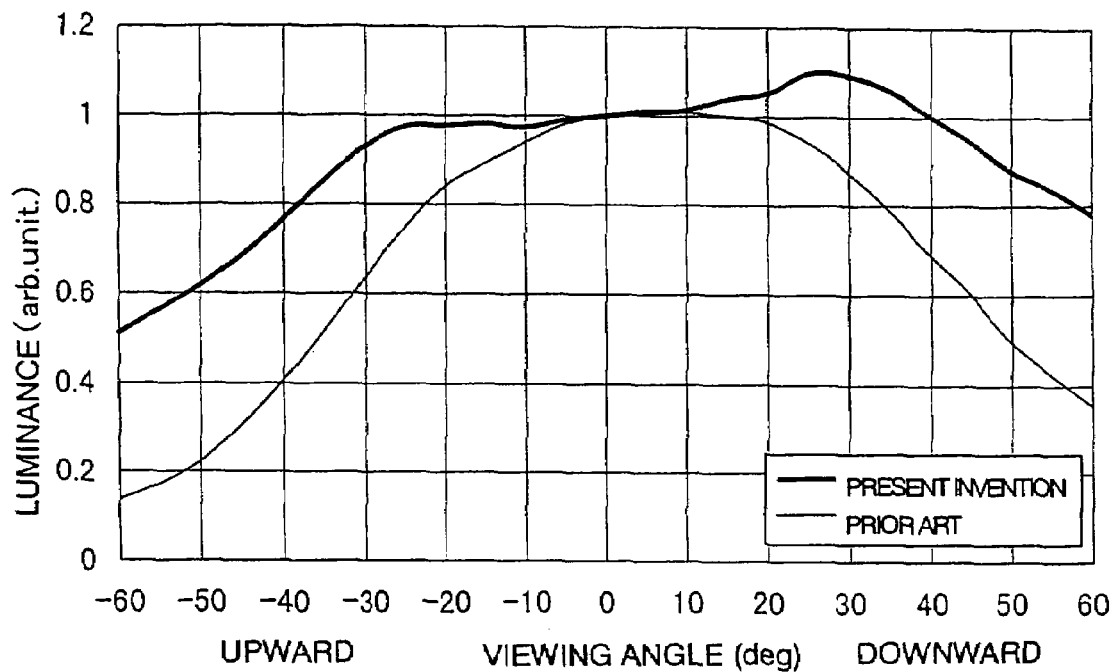
FIG. 12 is a view showing the luminance characteristic of the liquid crystal display device in Embodiment 1 of the present invention.
Figure 13:
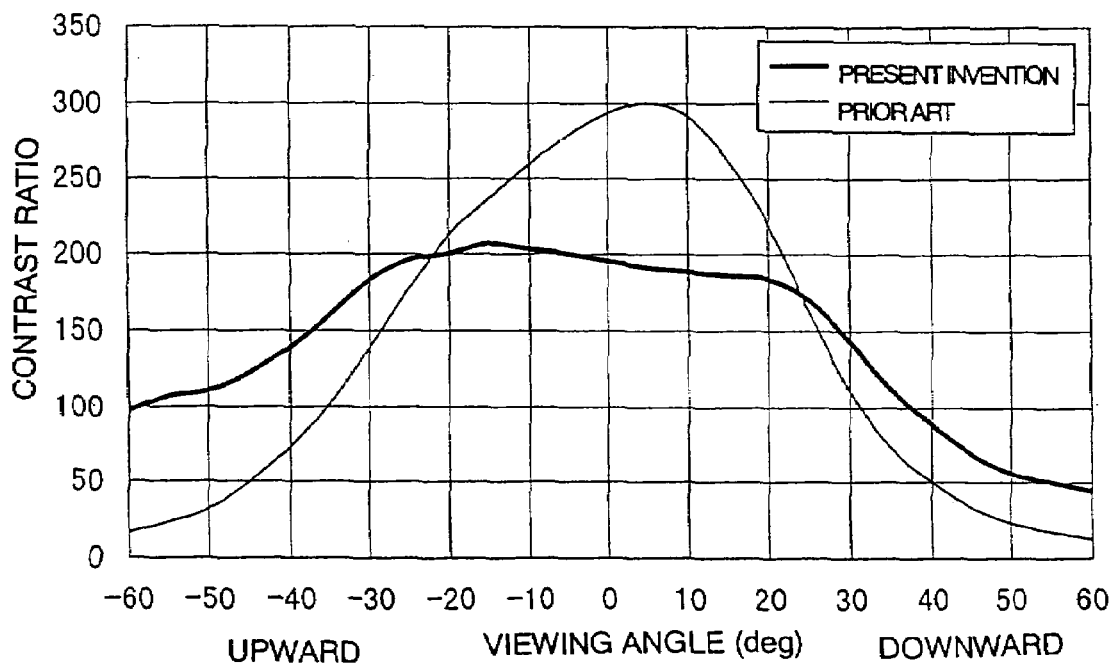
FIG. 13 is a view showing the viewing angle characteristic of the liquid crystal display device in Embodiment 1 of the present invention.

FIG. 12 shows the luminance characteristic of the liquid crystal display device in the vertical direction with respect to the screen (the direction in which the plurality of lenticules are arranged, that is, the direction vertical to the extension of the lenticules). FIG. 13 shows the viewing angle characteristic (relationship between the angle at which the screen is viewed and the contrast) of the liquid crystal display device in the vertical direction with respect to the screen. In FIGS. 12 and 13, the bold line represents the characteristics of the liquid crystal display device in this embodiment, and the fine line represents the characteristics of a conventional TN liquid crystal display device having no lens sheet. Both the luminance characteristic and the viewing angle characteristic were obtained by applying a voltage signal to the liquid crystal display device to effect monochrome display and measuring the luminance at positions in the vertical direction with respect to the screen using a viewing angle measuring apparatus. Note that the measurement of the luminance characteristic shown in FIG. 12 was obtained by normalization with the luminance which is observed along a normal to the screen of each liquid crystal display device.

As shown in FIG. 12, in the liquid crystal display device of this embodiment, the rate of change of the luminance with the viewing angle is small, and also the change of the luminance with the viewing angle is small, compared with the conventional liquid crystal display device. As shown in FIG. 13, in the liquid crystal display device of this embodiment, the front contrast is somewhat small compared with the conventional liquid crystal display device. However, the value of the contrast ratio with respect to the viewing angle is higher than the conventional value, and reversal of an image is prevented. Therefore, the liquid crystal display device can provide a wide viewing angle characteristic.

Thus, in this embodiment, the photocurable adhesive layer formed on the transparent support is irradiated with light, and then the lens sheet is pressed against the adhesive layer. The adhesive layer is then left standing in this state until the adhesive layer is cured to a degree of hardness with which the adhesion state between the lens sheet and the adhesive layer is fixed. Thereafter, the lens sheet fixed to the transparent support via the sufficiently cured adhesive layer is bonded to the polarizing plate via an adhesive layer. This suppresses the uneven surface of the polarizing plate, in particular, waves on the surface thereof from adversely influencing the surface state of the optical film. In addition, the optical film can be fixed and bonded without being peeled off.

A separator having a predetermined thickness is provided on the adhesive layer to which the optical film or the polarizing plate is to be bonded. The separator is peeled off immediately before the bonding of the optical film or the polarizing plate to the adhesive layer. This reduces occurrence of scars and deformation due to external force, and thus a liquid crystal display device with reduced display defects can be provided.

In this embodiment, a lenticular sheet was used as the lens sheet. The lens shape is not limited to this, but may preferably be changed based on the direction in which the viewing angle is desired to be wide. For example, when the viewing angle is desired to be wide in all directions, a sheet having a number of semispherical microlenses can be used. When the viewing angle is desired to be wide in the right and left directions, a sheet having lens arrays arranged in parallel with the vertical direction of the screen can be used.

The material of the transparent support is not limited to PET, but a transparent resin material such as polycarbonate (PC), polymethyl methacrylate (PMMA), and triacetyl cellulose (TAC) may be used.

EMBODIMENT 2

Embodiment 2 of the present invention will be described with reference to FIGS. 14 to 21.

Figure 14:
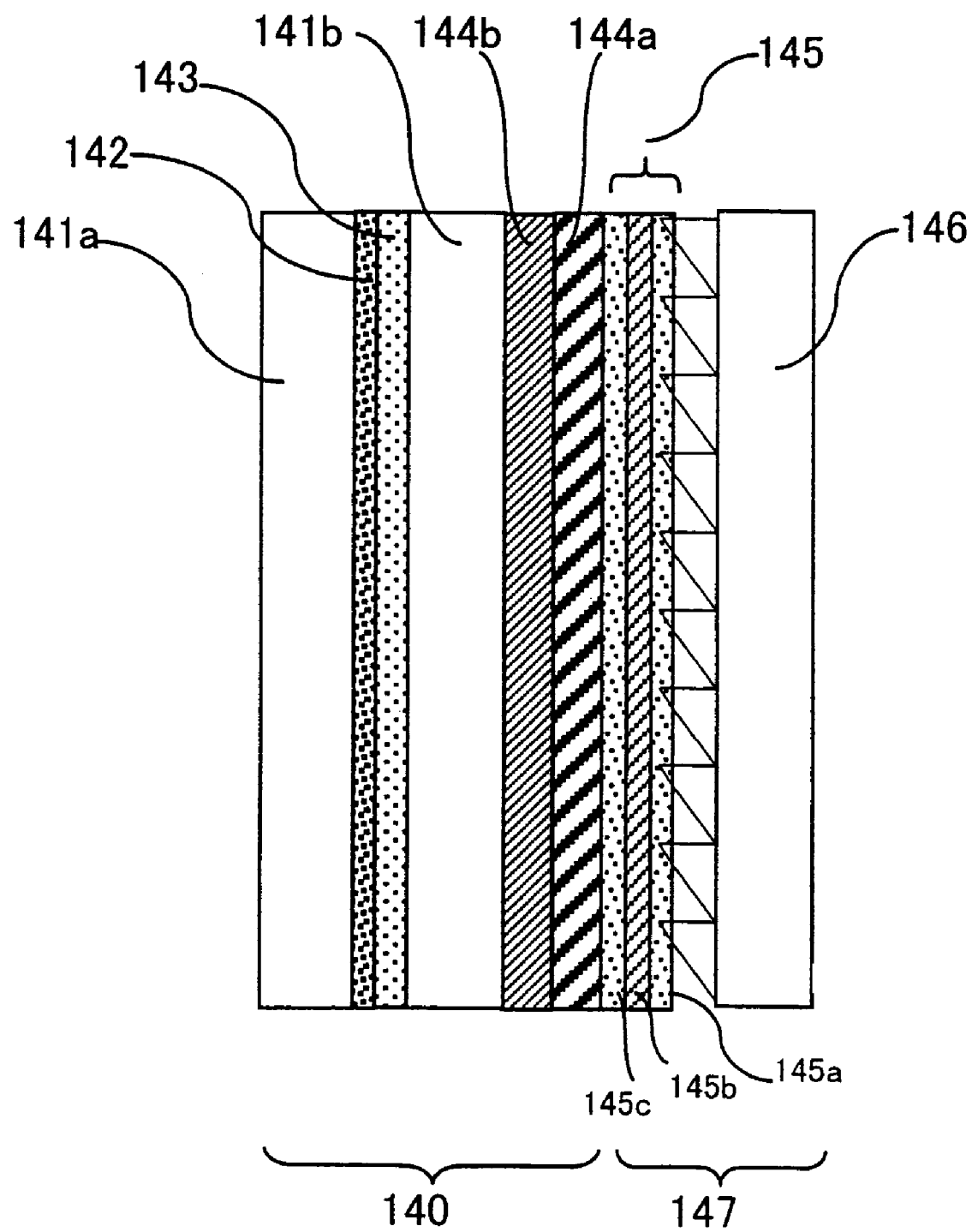
FIG. 14 is a schematic illustration of a liquid crystal display device in Embodiment 2 of the present invention.

FIG. 14 is a cross-sectional view illustrating a liquid crystal display device used in Embodiment 2 of the present invention. Referring to FIG. 14, the illustrated liquid crystal display device, which is of a reflection type, includes a reflection type liquid crystal display element 140 and a laminate film 147. The laminate film 147 includes a transparent member 145 and a prism sheet 146 as an optical film, and the transparent member 145 includes a first adhesive layer 145a, a transparent support 145b, and a second adhesive layer 145c.

The reflection type liquid crystal display element 140 is essentially including: an active matrix substrate 141a including thin film transistors (TFTs) and transparent pixel electrodes arranged in a matrix and a reflector 142 formed on a substrate made of glass, plastic, a monocrystalline silicon, or the like; TN liquid crystal material 143 having a twist angle of 45 degree; and a counter substrate 141b including transparent electrodes and color filters. The substrates 141a and 141b are bonded together with a sealing agent with the liquid crystal material 143 sealed therebetween. A λ/4 plate 144b and a polarizing plate 144a are placed on the outer surface of the counter substrate 141a of the reflection type liquid crystal display element 140, that is, on the viewer's side.

Figure 15:
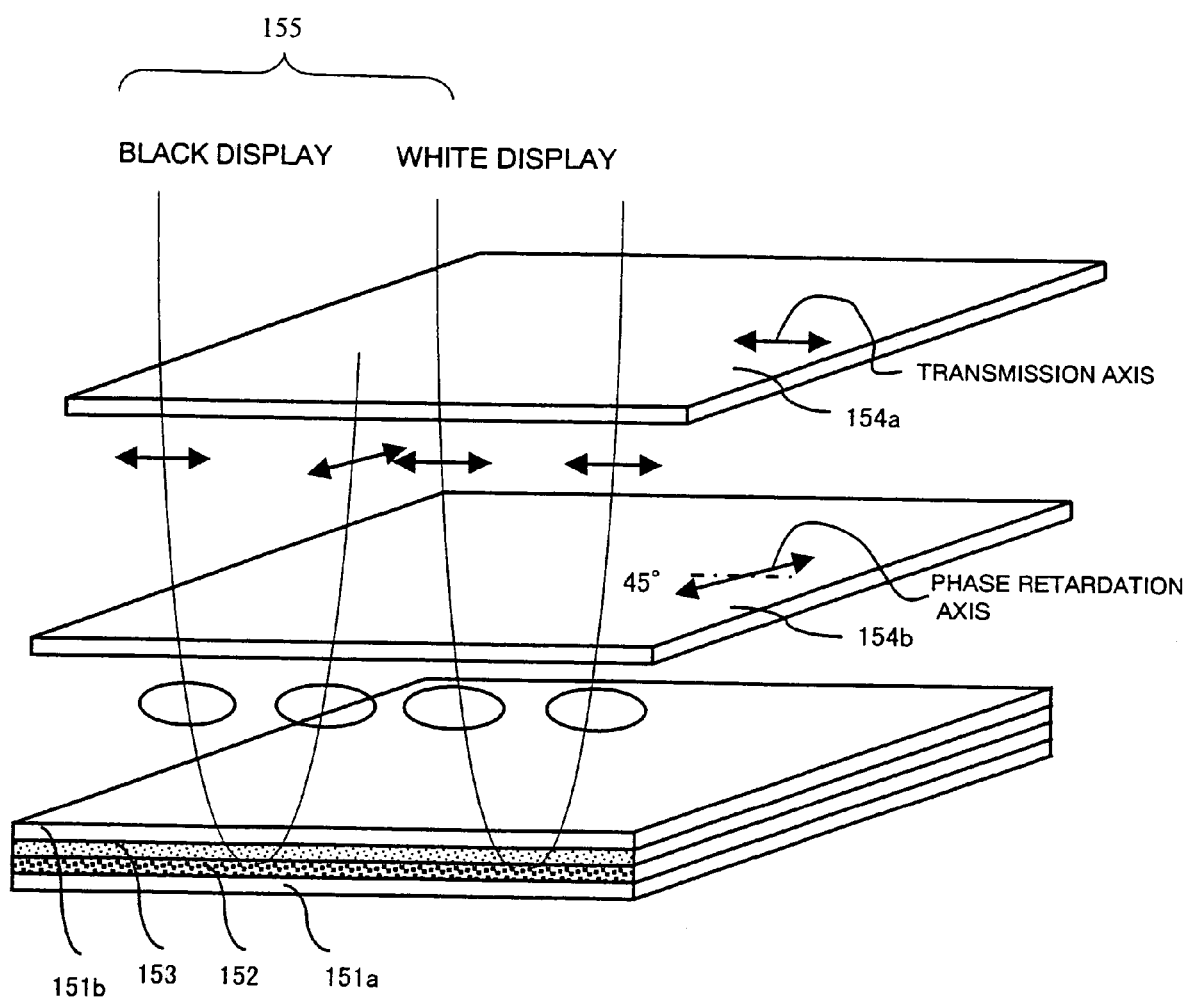
FIG. 15 is a view illustrating the display principle of a reflection type liquid crystal display device.

Referring to FIG. 15, the display principle of the reflection type liquid crystal display element in this embodiment will be described.

Incident illumination light 155 passes through a polarizing plate 154a and a λ/4 plate 154b and is reflected by a reflector 152. During this passing, the polarizing state of the illumination light 155 is modulated in a liquid crystal layer 153, whereby the amount of light outgoing from the reflection type liquid crystal display element is controlled and thus an image is displayed.

More specifically, the polarizing plate 154a is placed so that the transmission axis or the absorption axis thereof is at an angle of 45° with respect to the phase retardation axis (slow axis) or the phase advance axis (fast axis) of the λ/4 plate 154b. Linearly polarized light out of the illumination light 155 that has passed through the polarizing plate 154a is changed to a circularly-polarized light by the λ/4 plate 154b before it is incident on the reflection type liquid crystal display element. In the case where the liquid crystal layer 153 of the liquid crystal display element does not modulate the incident circularly polarized light, the direction of rotation of the circularly polarized light is reversed when it is reflected by the reflector 152. The reflected circularly polarized light returns through the λ/4 plate 154b to the polarizing plate 154a, where the circularly polarized light is changed to linearly polarized light orthogonal to the transmission axis of the polarizing plate 154a and thus absorbed. As a result, black is displayed.

In the case where the liquid crystal layer 153 of the liquid crystal display element modulates the incident circularly polarized light so that the circularly polarized light is reflected without change, the reflected circularly polarized light returns through the λ/4 plate 154b to the polarizing plate 154a, where the circularly polarized light is changed to linearly polarized light matching with the transmission axis of the polarizing plate 154a and thus outputted. As a result, color is displayed.

The directions of the transmission axis of the polarizing plate 154a and the phase retardation axis of the λ/4 plate 154b are determined in consideration of the kind and the orientation direction of the liquid crystal material, the viewing angle characteristic, and the like. As the phase plate, a layered structure of a λ/2 plate and a λ/4 plate may be used.

Figure 2B:
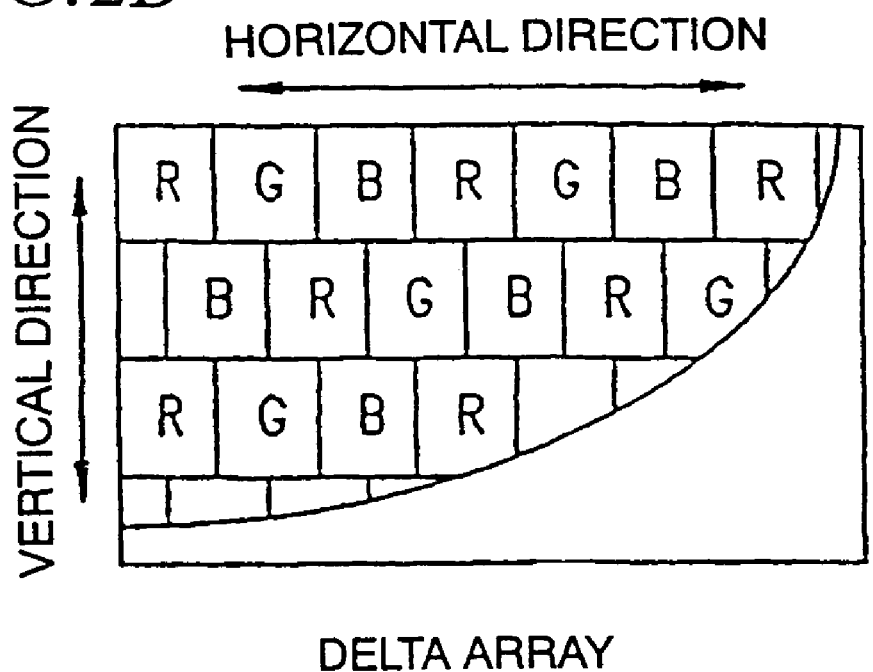

In this embodiment, for color display, color filters of the three primary colors, red (R), green (G), and blue (B), are placed on the counter substrate 141b for respective pixels as described above. Color is imparted to light passing through each of the color filters. The R, G, and B pixels can be arranged in various array patterns, such as the stripe array shown in FIG. 2A and a delta array shown in FIG. 2B, where picture elements are arranged repeatedly in the horizontal and vertical directions.

The number of pixels and the size of each pixel vary with the panel size. In this embodiment, used was a 3.9-inch reflection type liquid crystal display element in the stripe array with the number of pixels of 320 (each of R, G, and B) horizontally×240 vertically, and a horizontal pixel pitch Ph of 0.0826 mm and a vertical pixel pitch Pv of 0.248 mm.

The color filters are not necessarily provided on the counter substrate. For example, it may be formed on the pixel electrodes of the active matrix substrate.

The prism sheet 146, which is bonded to the outer surface of the polarizing plate 144a on the viewer's side via the transparent member 145, will be described with reference to FIG. 16. Note that the prism sheet denoted by the reference numeral 166 in FIG. 16 is the same as the prism sheet shown in FIG. 14.

The prism sheet 166 includes a plurality of prisms 166*a* arranged in parallel with one another. In this embodiment, the plurality of prisms are arranged to extend in a direction parallel to the lateral direction of the screen of the liquid crystal display element, for the purpose of widening the viewing angle in the upward and downward directions with respect to the screen.

The prism sheet 166 is formed using a mold in a shape of repeated prisms, for example, by transferring the repeated prism shape to acrylic material by injection molding. In this embodiment, formed were the prisms 166*a* having a pitch P2 of 0.10 mm, a height h2 of 0.027 mm, an angle $\theta 1$ of $15°\pm 2°$, and an angle $\theta 2$ of $90°\pm 2°$.

A reflection prevention film (not shown) may be formed on the surface of the prism sheet 166 opposite to the prism-formed surface. This improves the transmittance of the prism sheet 166. In this embodiment, a reflection prevention film including a $MgF_2$ thin film and a $SiO_2$ thin film each having a thickness of about 0.1 µm layered alternately was directly formed by evaporation. Reflection energy can be reduced by interference between the thin films. With this reflection prevention film, the surface reflection of about 4% was successfully reduced to 1% or less, and thus the transmittance of the prism sheet 166 improved.

Next, the transparent member used in this embodiment will be described in detail, followed by brief description of the method for fabricating a liquid crystal display device in this embodiment.

Figure 17A:
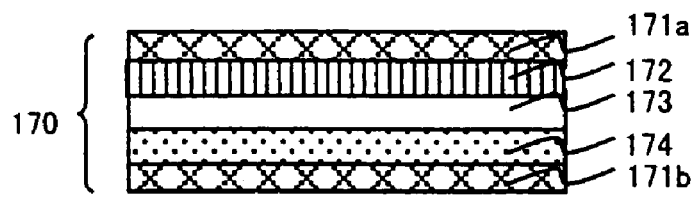
FIGS. 17A, 17B, 17C, and 17D are views illustrating a fabrication process for the liquid crystal display device in Embodiment 2 of the present invention.

The transparent member 145 in FIG. 14, including a transparent support 145*b* and adhesive layers 145*a* and 145*c* formed on both surfaces of the transparent support 145*b*, is produced using an adhesive film 170 shown in FIG. 17A. Note that the transparent support 145*b* and the adhesive layers 145*a* and 145*c* in FIG. 14 correspond to the transparent support 173 and the adhesive layers 172 and 174 in FIG. 17A, respectively. As shown in FIG. 17A, adhesive layers 172 and 174 are formed on the opposing surfaces of a transparent support 173, and are protected by separators 171*a* and 171*b* formed thereon.

At least one of the two adhesive layers to which the optical film (in this embodiment, the prism sheet) is to be bonded is made of a material of which the cured state changes by application of external energy, such as a photocurable resin. In this embodiment, the adhesive layer 172 was formed of a photocurable resin, and the adhesive layer 174 was formed of an acrylic resin. A PET film having a thickness of 0.075 mm was used as the transparent support 173. As the separators 171*a* and 171*b*, a PET film having a thickness of 0.05 mm was used. The thickness of the separators is not limited to this, but is determined so as to minimize the number of defects due to scars, for example, as in the thickness of the separators used in Embodiment 1.

Figure 17B:
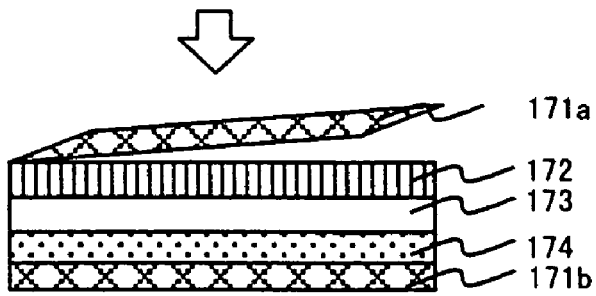
Figure 17C:
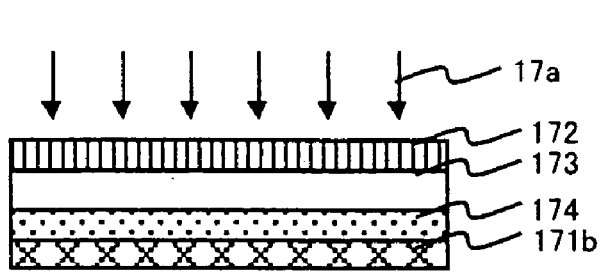
Figure 17D:
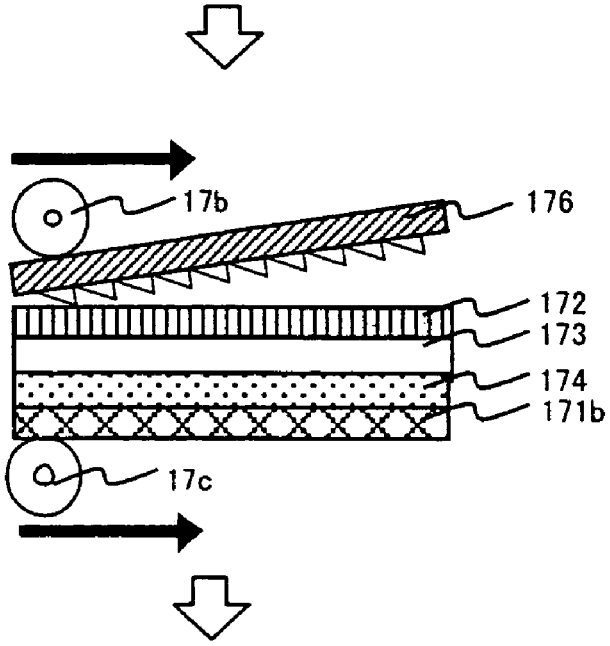

First, as in Embodiment 1, the prism sheet as the optical sheet is bonded to the adhesive film 170. Specifically, as shown in FIG. 17B, the separator 171*a* covering the adhesive layer 172 of the adhesive film 170 is peeled off, and as shown in FIG. 17C, the adhesive layer 172 is irradiated with light 17*a*. Subsequently, as shown in FIG. 17D, the prism sheet 176 is pressed against the adhesive layer 172. In this embodiment, a metal halide lamp was used to irradiate the adhesive layer 172 with 1.6 $J/cm^2$ ultraviolet light, and then the prism sheet 176 was pressed against the adhesive layer 172 with rollers 17*b* and 17*c*.

Figure 18A:
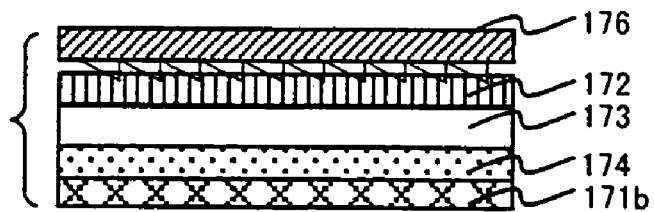
FIGS. 18A, 18B, 18C and 18D are views illustrating the fabrication process for the liquid crystal display device in Embodiment 2 of the present invention.
Figure 18A:
Figure 18B:
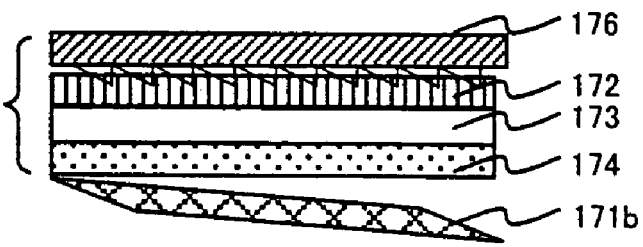
Figure 18B:
Figure 18C:
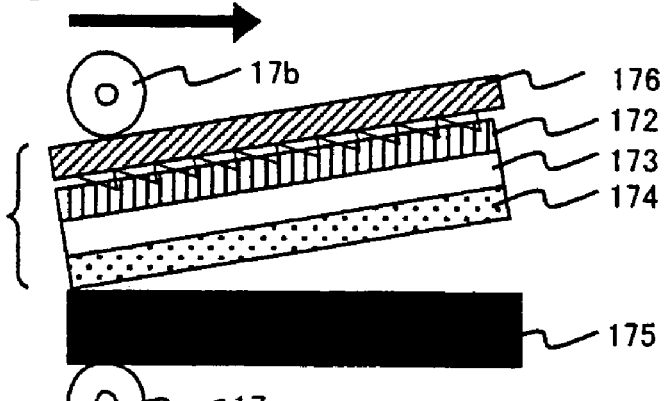
Figure 18C:

With the prism sheet 176 kept pressed against the adhesive layer 172, the adhesive layer 172 is cured to a degree that the adhesion state between the prism sheet 176 and the adhesive layer 172 is kept unchanged in the subsequent processes (FIG. 18A). Specifically, as described in Embodiment 1, the adhesive layer 172 is desirably cured until a gel fraction of 50 wt % or more is obtained. In this embodiment, as in Embodiment 1, the adhesive layer 172 was left standing at room temperature for 24 hours to obtain a gel fraction of about 75 wt %.

By curing the adhesive layer 172 as described above, the transparent support 173 can support the prism sheet 176 in substantially the flat state. As a result, when the prism sheet 176 is bonded to a rough surface having a somewhat uneven shape, such as the surface of the polarizing plate, via the transparent support 173 in a subsequent process, transfer of the uneven shape of the rough surface to the prism sheet 176 can be reduced.

Figure 18D:
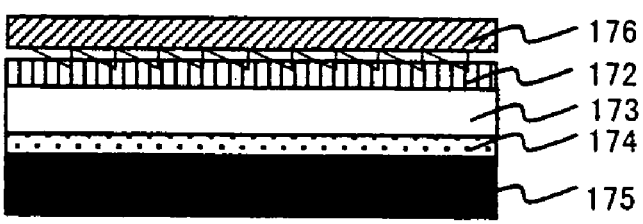
Figure 19A:
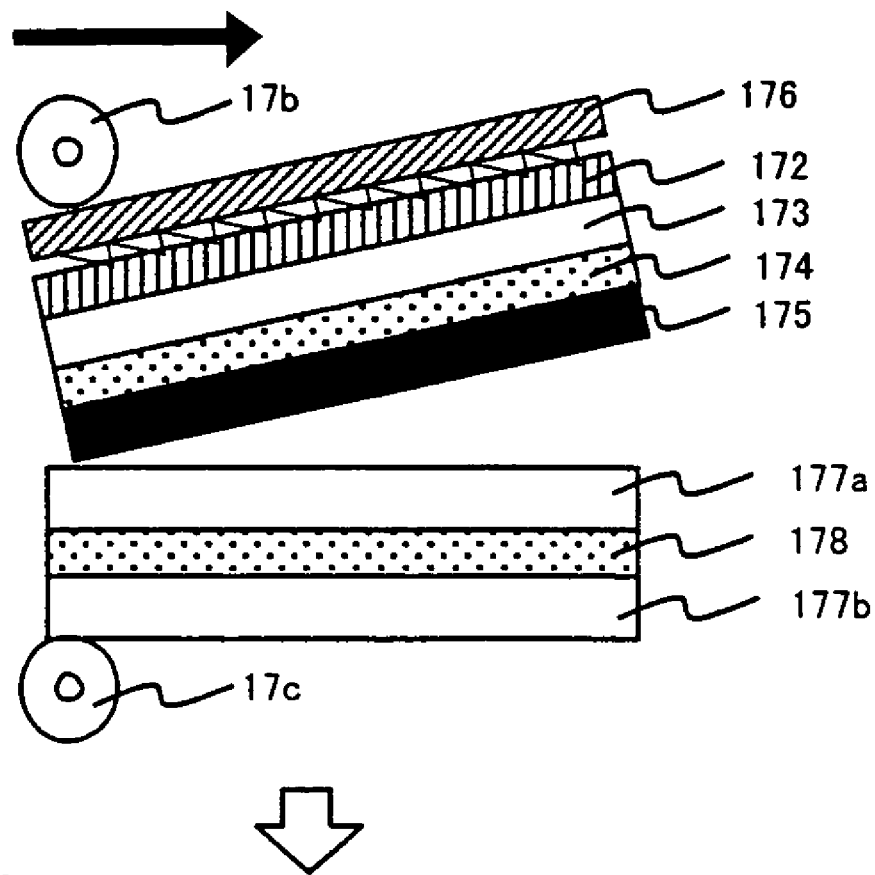
FIGS. 19A and 19B are views illustrating the fabrication process for the liquid crystal display device in Embodiment 2 of the present invention.
Figure 19B:
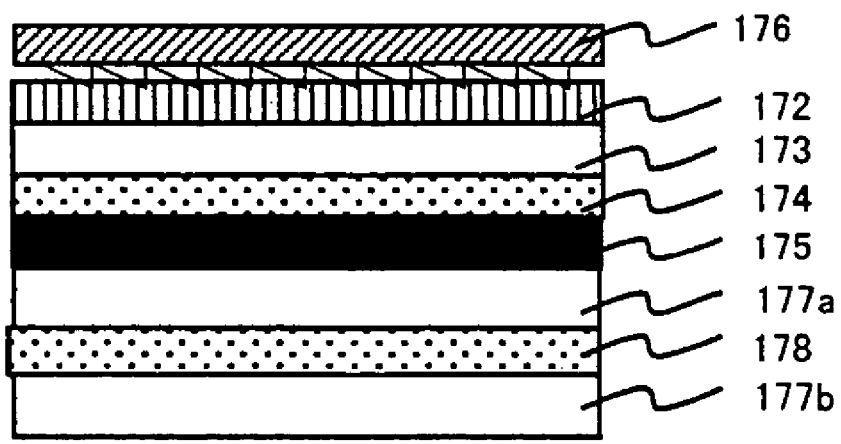

After curing of the adhesive layer 172, the separator 171*b* is peeled off (FIG. 18B), and a polarizing plate 175 is pressed against the adhesive layer 174 with the rollers 17*b* and 17*c* (FIG. 18C), to produce a laminate including the prism sheet 176 and the polarizing plate 175 bonded together via the adhesive film (FIG. 18D). The resultant laminate is bonded to the substrate of the reflection type liquid crystal display element on the viewer's side (FIG. 19A), to obtain the reflection type liquid crystal display device in this embodiment (FIG. 19B).

Figure 20A:
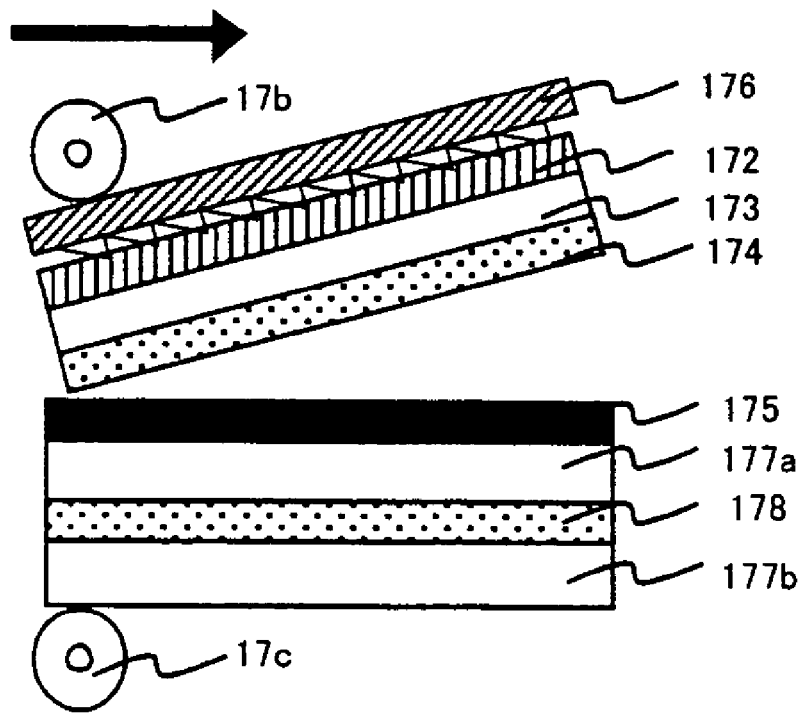
FIGS. 20A and 20B are views illustrating a modification of the fabrication process for the liquid crystal display device of Embodiment 2 of the present invention.
Figure 20A:
Figure 20B:
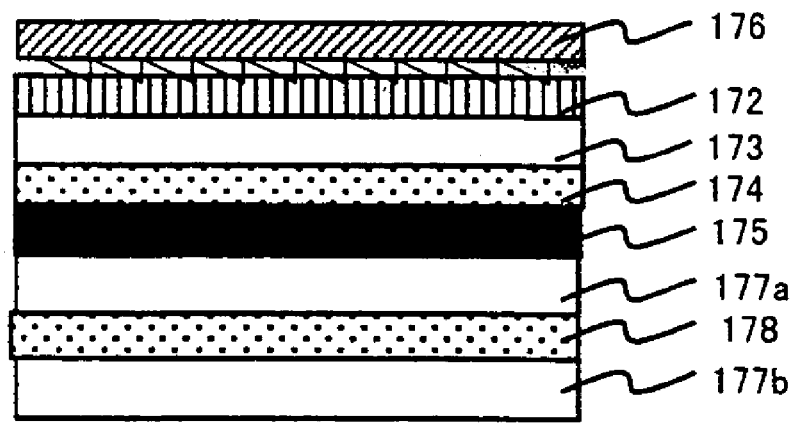
Figure 21:
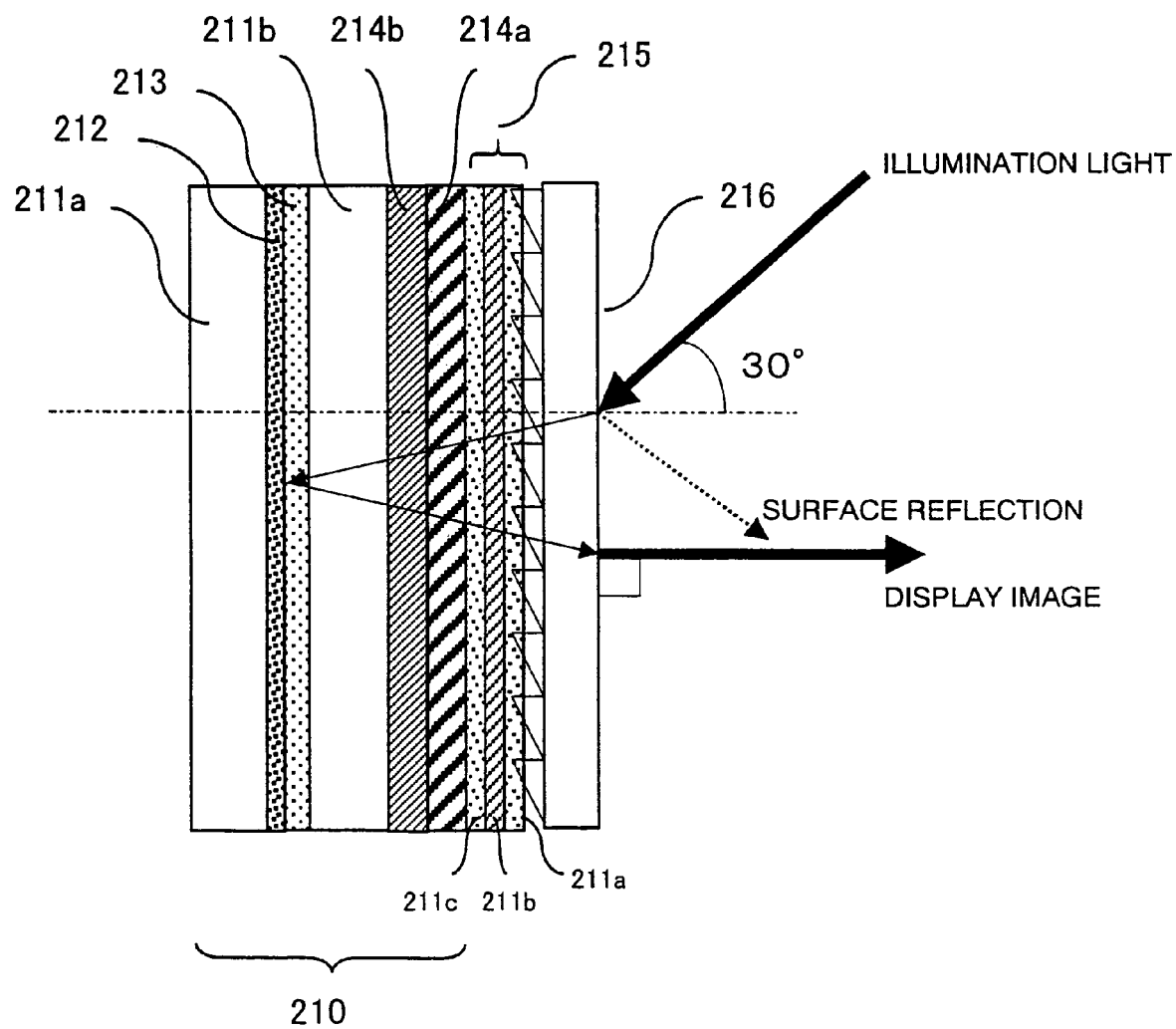
FIG. 21 is a view illustrating an offset of the optical axis in the liquid crystal display device in Embodiment 2 of the present invention.
Figure 23A:
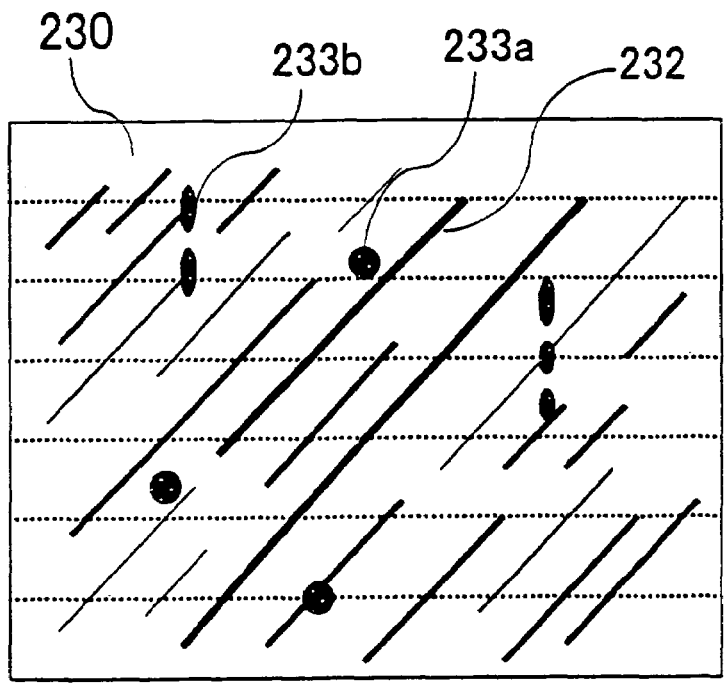
FIGS. 23A and 23B are views for explaining deterioration in display quality due to waves on a polarizing plate.
Figure 23B:
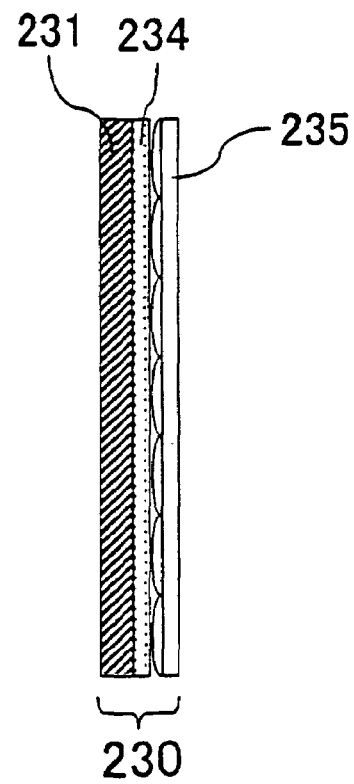

The process of bonding the prism sheet 176 to the polarizing plate 175 and to the reflection type liquid crystal display element is not limited to that described above. Any other method may be adopted as long as the prism sheet can be fixed to the adhesive film before the prism sheet is bonded to the polarizing plate by pressing the prism sheet against the adhesive film and curing the adhesive layer existing between the prism sheet and the adhesive film so sufficiently that no change is allowed in the adhesion state between the prism sheet and the adhesive layer in the subsequent processes. By fixing the prism sheet as described above, it is possible to reduce the occurrence that the uneven surface of the polarizing plate, in particular, waves on the surface thereof are transferred to the prism sheet and thus adversely influence the display quality. Therefore, the bonding process may proceed as shown in FIGS. 20A and 20B, for example, where the polarizing plate 175 is previously bonded to a substrate 177*a* of the liquid crystal display element on the viewer's side, and then the laminate of the prism sheet 176 and the adhesive film is pressed against the polarizing plate 175.

The adhesive layer 174 may be formed on the surface of the polarizing plate 175, not on the transparent support 173. In this case, also, the prism sheet 176 and the adhesive film 170 are bonded together, and after the adhesive layer 172 is cured sufficiently so that the prism sheet 176 can be fixed to the adhesive film 170 in a desired adhesion state, the resultant laminate of the prism sheet 176 and the adhesive film 170 is bonded to the polarizing plate 175. By this process, also, it is possible to reduce the occurrence that the uneven surface of the polarizing plate 175, in particular, waves on the surface thereof influence the surface of the prism sheet 176.

As described above, by pressing the prism sheet 176 against the adhesive layer 172 of the adhesive film 170 and then curing the adhesive layer 172 sufficiently, the concave and convex shape of the prism array formed on the prism sheet 176 can be fixed to the transparent support 173. The prism surface is therefore prevented from deformation by external force. In addition, by curing the adhesive layer 172 sufficiently, the adhesion state of the prism sheet 176 is reliably fixed by the transparent support 173. By this fixation, when the polarizing plate 175 is bonded to the surface of the transparent support 173 of the adhesive film on the side opposite to the prism sheet 176, the prism surface is prevented from being influenced by waves on the polarizing plate 175, and thus the display quality can be improved.

In the reflection type liquid crystal display device in this embodiment fabricated in the manner described above, as shown in FIG. 21, illumination light incident on the display screen at an angle of about 30° from the normal to the display screen is reflected from the reflector to be output in the direction normal to the display screen. This allows a regular reflection image from the reflector to be observed as a display image, enabling bright display. In addition, regular reflection light from the surface of the prism sheet is reflected in a direction different from the direction in which the display image is reflected. Thus, the regular reflection light does not adversely influence the display.

As described above, in the liquid crystal display device in this embodiment, the laminate film including the prism sheet having a plurality of concave and convex portions and the adhesive film is bonded to the polarizing plate placed on the viewer's side of the liquid crystal display element. In particular, the prism sheet is pressed against and fixed to the photocurable adhesive layer, and the optical film is bonded to the polarizing plate via the transparent support. With this construction, waves generated on the surface of the polarizing plate can be absorbed and reduced. In addition, the prism sheet can be fixed and bonded without being peeled off. The resultant liquid crystal display device is free from deterioration in display quality.

The separator having a predetermined thickness is placed on the outer surface of the adhesive film to prevent generation of scars and deformation due to external force during the bonding of the prism sheet to the adhesive layer. In this way, a liquid crystal display device with reduced display defects is provided.

The prism sheet is pressed against and fixed to the curable adhesive layer, and then the adhesive film is pressed against the polarizing film. In this way, the optical film and the polarizing film can be bonded and fixed to each other. Thus, a fabrication method capable of preventing influence of waves on the surface of the polarizing plate can be provided.

Note that the shape of the prism sheet used in this embodiment is not limited to that described above, but can be appropriately selected depending on the refractive index of the prism sheet and the desired illumination environment (direction of illumination light).

Thus, as described above, in the method for fabricating a laminate film according to the present invention, after external energy is applied to the adhesive layer made of a material of which the cured state changes by application of external energy, the optical film is pressed against the adhesive layer. The adhesive layer is then cured to a degree of hardness with which the adhesion state between the optical film and the adhesive layer is fixed. By the above method, it is possible to obtain a laminate film including the optical film sustained in substantially the flat state by the transparent support via the adhesive layer. When this laminate film is bonded to a polarizing plate or the like having waves generated on the surface thereof, it is possible to prevent generation of in-plane variation in the surface state of the optical film due to the waves or the like, and thus uniform optical characteristics is obtained for the optical film. Therefore, by combining the laminate film with a display element, it is possible to overcome the problem of the display quality being deteriorated by distortion of the lens characteristics.

In particular, by using a photocurable resin as the material of which the cured state changes by application of external energy, the optical film and the transparent support can be easily bonded and fixed together. It is therefore possible to reduce generation of defects due to scars and external force.

By using a lens sheet having a plurality of microlens arrays as the optical film, provided is a high-performance laminate film that can reduce distortion of the lens characteristics of the lens sheet that is sensitive to the contact state with the adhesive layer, and can suppress deterioration in display quality due to waves on the polarizing plate and due to generation of scars and deformation by external force.

By placing a surface protection film having a thickness t in the range of $0.035 \text{ mm} \leq t \leq 0.2 \text{ mm}$ on the outer surface of the adhesive layer of the adhesive film, it is possible to prevent deformation of the pre-cured adhesive layer due to existence of foreign matters and external force and thus reduce the number of defects that may deteriorate the display quality. As a result, bonding between the optical film and the transparent member is facilitated.

In the method for fabricating a display device according to the present invention, the laminate film including the optical film described above is placed on the viewer's side of a display element. With this construction, it is possible to prevent the unevenness of the surface, in particular, waves on the surface of the display element to which the laminate film is bonded from being transferred to the optical film, causing variation in optical characteristics. As a result, it is possible to provide a display device in which the optical characteristics including in particular the viewing angle characteristic are improved without deteriorating the display quality.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A display device comprising: a display element;
an optical film provided on a viewer's side of the display element; and
an adhesive film having a transparent support, and a first adhesive layer of a first type formed on a respective one of two opposing surfaces of the transparent support and a second adhesive layer of a second, different type formed on the other of the two opposing surfaces, wherein the optical film is bonded to the first adhesive layer and the display element is bonded to the second adhesive layer, wherein the first adhesive layer is made of a material of which the cured state changes by an application of external energy, wherein the first adhesive layer has a gel fraction of 50 wt % or more, wherein the transparent support has a roughness Rt satisfying $$Rt < 2 \text{ μm}$$

when the roughness Rt is defined as the distance between the highest crest and the deepest trough within a range of a length evaluated, and wherein the surface of the display element bonded to the second adhesive layer includes a region having a roughness Rt1 satisfying $$Rt1 > 2 \text{ μm}$$

when the roughness Rt1 is defined as the distance between the highest crest and the deepest trough within a range of a length evaluated.

2. The display device of claim 1, wherein the optical film is a lens sheet having a plurality of lenses, and pressed against the first adhesive layer with the surface having the plurality of lenses facing the first adhesive layer.

3. The display device of claim 2, wherein the lens sheet is a lenticular sheet having a plurality of semi cylindrical lenticules extended in parallel with one another.

4. The display device of claim 1, wherein the optical film is a prism sheet having a plurality of prisms.

5. The display device of claim 1, wherein the display element is a liquid crystal display element including a pair of substrates, a liquid crystal layer sandwiched between the pair of substrates, and optical characteristic changing means placed on at least the viewer's side of the pair of substrates for changing the optical characteristics of incident light, and the optical film is bonded to the liquid crystal display element by bonding the optical characteristic changing means and the transparent support of the adhesive film together via the second adhesive layer.

6. The display device of claim 5, wherein the optical characteristic changing means is a polarizing plate.

7. The display device of claim 5, wherein the optical characteristic changing means is a phase plate.

8. The display device of claim 1, wherein the first adhesive layer of the first type is a photocurable resin type adhesive layer and the second adhesive layer of the second, different type is an acrylic resin type adhesive layer.

9. A display device comprising: a display element; an optical film provided on a viewer's side of the display element; and an adhesive film comprising a transparent support, and an adhesive layer of a first type formed on a respective one of two opposing surfaces of the transparent support and a an adhesive layer of a second, different type formed on the other of the two opposing surfaces, wherein the optical film is bonded to the adhesive layer of the first type and the display element is bonded to the adhesive layer of the second type, wherein the adhesive layer of the first type is made of a material of which the cured state changes by an application of external energy, wherein the transparent support has a roughness Rt satisfying $$Rt < 2\ \mu m$$

when the roughness Rt is defined as the distance between the highest crest and the deepest trough within a range of a length evaluated, and wherein the surface of the display element bonded to the second adhesive layer includes a region having a roughness Rt1 satisfying $$Rt1 > 2\ \mu m$$

when the roughness Rt1 is defined as the distance between the highest crest and the deepest trough within a range of a length evaluated.

10. The display device of claim 9, wherein the optical film is a lens sheet having a plurality of lenses, and pressed against the adhesive layer of the first type with the surface having the plurality of lenses facing the adhesive layer of the first type.

11. The display device of claim 10, wherein the lens sheet is a lenticular sheet having a plurality of semi cylindrical lenticules extended in parallel with one another.

12. The display device of claim 9, wherein the optical film is a prism sheet having a plurality of prisms.

13. The display device of claim 9, wherein the display element is a liquid crystal display element including a pair of substrates, a liquid crystal layer sandwiched between the pair of substrates, and optical characteristic changing layer placed on at least the viewer's side of the pair of substrates for changing the optical characteristics of incident light, and the optical film is bonded to the liquid crystal display element by bonding the optical characteristic changing layer and the transparent support of the adhesive film together via the adhesive layer of the second type.

14. The display device of claim 13, wherein the optical characteristic changing layer is a polarizing plate.

15. The display device of claim 13, wherein the optical characteristic changing layer is a phase plate.

16. The display device of claim 9, wherein the adhesive layer of the first type is a photocurable resin type adhesive layer and the adhesive layer of the second, different type is an acrylic resin type adhesive layer.

* * * * *